United States Patent
Chu et al.

(10) Patent No.: US 6,934,345 B2
(45) Date of Patent: Aug. 23, 2005

(54) APPARATUS, METHOD AND SYSTEM FOR CORRELATED NOISE REDUCTION IN A TRELLIS CODED ENVIRONMENT

(75) Inventors: Fred Chu, Madison, AL (US); Kevin W. Schneider, Huntsville, AL (US)

(73) Assignee: ADTRAN, Inc., Huntsville, AL (US)

( * ) Notice: Subject to any disclaimer, the term of this patent is extended or adjusted under 35 U.S.C. 154(b) by 807 days.

(21) Appl. No.: 09/761,910

(22) Filed: Jan. 17, 2001

(65) Prior Publication Data

US 2002/0094043 A1 Jul. 18, 2002

(51) Int. Cl.$^7$ .................................................. H04B 1/10
(52) U.S. Cl. ..................................... 375/346; 375/232
(58) Field of Search ........................ 375/229, 231–233, 375/316, 340, 346, 348

(56) References Cited

U.S. PATENT DOCUMENTS

| | | | | |
|---|---|---|---|---|
| 5,031,195 A | * | 7/1991 | Chevillat et al. | 375/234 |
| 5,453,797 A | * | 9/1995 | Nicolas et al. | 348/607 |
| 5,513,216 A | * | 4/1996 | Gadot et al. | 375/233 |
| 5,777,692 A | * | 7/1998 | Ghosh | 348/725 |
| 6,438,164 B2 | * | 8/2002 | Tan et al. | 375/233 |
| 6,687,235 B1 | * | 2/2004 | Chu | 370/286 |

* cited by examiner

*Primary Examiner*—Kevin Burd
(74) *Attorney, Agent, or Firm*—Thomas, Kayden, Horstemeyer & Risley, L.L.P.

(57) ABSTRACT

An apparatus, method and system are provided for correlated noise reduction, in a trellis decoding environment, such as second generation HDSL, in which crosstalk impairments may be significant. The preferred embodiments provide equalization and correlated noise reduction, utilizing a training period to generate corresponding coefficients, and utilizing two different training error signals. In addition, the apparatus method and system also provide continued and adaptive correlated noise reduction during data transmission, utilizing two additional error signals, a trellis error signal and a tentative error signal. The trellis error signal is a decision error of a selected previous state of a selected trellis path, in which the selected trellis path has a smallest cumulative error of a plurality of trellis paths, and the selected previous state is preferably the immediately previous state. The tentative error signal is formed as a difference between a delayed, tentative symbol decision and a delayed received data signal subsequent to equalization, in which the delay is preferably one symbol time. The various embodiments may be utilized with trellis encoding, with or without data precoding.

49 Claims, 10 Drawing Sheets

FIG. 12

| CROSSTALK ENVIRONMENT | CORRELATION CANCELLER IMPROVED PERFORMANCE MARGIN (db) |
|---|---|
| 24T1+24 HDSL2(C) | 1.4 |
| 39 HDSL2(C) | 1.5 |
| 24 ADSL+24 HDSL(C) | 1.8 |
| 24 T1+24 HDSL2(R) | 1.4 |

APPARATUS, METHOD AND SYSTEM FOR CORRELATED NOISE REDUCTION IN A TRELLIS CODED ENVIRONMENT

FIELD OF THE INVENTION

The present invention relates, in general, to noise predictor or canceller devices and, more specifically, to noise predictors that may be utilized within or in conjunction with equalization and trellis decoding to remove, diminish or whiten correlated noise for high-speed data transmission in digital subscriber line environments with crosstalk.

BACKGROUND OF THE INVENTION

With the advent of high-speed data transmission systems, various technologies have emerged to provide increased reliability and robustness of the data transmitted and received. One technique that is commonly used to accomplish this is trellis coded modulation ("TCM"), where such data is trellis encoded and then mapped or modulated onto any of various, standardized signaling formats or constellations for transmission, such as pulse amplitude modulation ("PAM") or quadrature amplitude modulation ("QAM").

To simultaneously achieve both coding gain and decision feedback equalization performance, such data for transmission also may be "precoded" (known as Tomlinson-Harashima ("Tomlinson") precoding), to provide a pre-equalization functionality prior to data transmission. For such precoding, a reciprocal training mode is utilized between two data communication devices ("DCDs") which are in communication with each other through a communication channel. In this training mode, an equalizer within the receiver of each DCD determines a plurality of linear filter coefficients to, among other things, correct for various channel impairments, such as varying frequency responses and various types of noise. Each given DCD then transmits its own, individually determined equalization coefficients, referred to in the art as "Tomlinson" or "Tomlinson-Harashima" coefficients, to the other DCD, such that the other DCD then may utilize these coefficients in its transmission of data to the given DCD.

Different equalization and precoding schemes have been utilized or are being proposed for precoding in various high-speed data transmission systems, and are being included as recommendations or standards, such as the T1.418 standard accredited by the American National Standards Institute ("ANSI"). For example, for communication systems such as high bit rate digital subscriber line ("HDSL") systems, no precoding is utilized, while for the next or second generation HDSL as proposed in the ANSI T1.418 standard, generally referred to as "HDSL2", Tomlinson-Harashima precoding is utilized. Tomlinson-Harashima precoding schemes are also utilized for systems such as G.shdsl of the International Telecommunications Union ("ITU") recommendation G.991.2 and some other forms of digital subscriber line systems generally referred to as "xDSL".

Particular difficulties arise in high speed data transmission in environments such as xDSL, due to, among other things, the use of cables comprised of many sets of twisted pair wires, in which a single twisted pair (two wires) is used for full duplex transmission over a given communication channel. In some environments, the noise power spectral density may be substantially "white", with noise power distributed rather flatly across the frequency spectrum. For environments such as xDSL, however, with as many as fifty twisted pairs of lines providing service, cross-talk impairments become very significant, with significant correlated noise, and having a noise power distributed very unevenly across the frequency spectrum. For example, for xDSL environments, data reception includes not only reception of a transmitted signal, but also reception of as many as 49 crosstalk noise contributions and other noise couplings between the various pairs of wires. In addition, there is a significant variability in the types of anticipated crosstalk. This potential correlated noise poses various unique problems for accurate data transmission and reception.

Another difficulty which arises for noise reduction with xDSL is its use of trellis decoding. Depending upon the depth of the trace or path back through the trellis, such trellis decoding may introduce a significant delay, typically on the order of several (or more) symbol time periods, which cannot be tolerated with prior art noise cancellers or noise predictors. For example, in Gadot et al. U.S. Pat. No. 5,513,216 and Wang U.S. Pat. No. 5,604,769, both entitled "Hybrid Equalizer Arrangement for Use in Data Communications Equipment", a noise predictor is illustrated for use with an equalizer, during a training mode prior to data transmission, to determine coefficients for transmission-side precoding. Neither the Gadot patent nor the Wang patent, however, illustrate or otherwise disclose how such a noise predictor should be used with a trellis decoder for ongoing adaptation during actual data transmission, particularly in light of the potential delays involved in trellis decoding.

As a consequence, a need remains for an apparatus, method and system for correlated noise reduction or whitening, utilizing a noise predictor which may be implemented as part of or with an equalizer, to substantially reduce correlated or non-white noise in data reception and transmission. Such a noise predictor should be readily adaptive, converging quickly to optimal linear filter values without excessive training time. In addition to providing precoding coefficients, such an apparatus, method and system for correlated noise reduction should also provide adaptive functionality during data transmission, to adjust to potentially changing noise levels and spectral distributions. Such an apparatus, method and system for correlated noise reduction should provide noise whitening during data transmission within a system utilizing a trellis decoder, both with or without transmission-side precoding. Lastly, such a noise predictor should be capable of implementation as a linear adaptive filter.

SUMMARY OF THE INVENTION

An apparatus, method and system are provided for correlated noise reduction, to whiten additive noise and remove correlated noise from a received signal, in a trellis decoding environment, such as second generation HDSL (HDSL2). The preferred embodiments operate in two modes, a training mode and a data (transmission) mode.

During training mode, equalization and correlated noise reduction coefficients are determined utilizing two training error signals, a first training error signal and a second training error signal. When data for transmission is to be precoded, the equalization and correlated noise reduction coefficients are transferred to a transmitter, as Tomlinson coefficients for precoding.

During data mode, the equalization and correlated noise reduction coefficients continue to adapt to potentially changing noise conditions, utilizing two additional error signals, a trellis error signal and a tentative error signal.

More specifically, during the training mode, the preferred apparatus provides two functional elements for signal processing for equalization and a third functional element for signal processing for noise prediction, to generate corresponding coefficients, utilizing the two different training error signals. A linear feedforward equalizer (LEQ) or filter is utilized to determine a first set of coefficients (a(n)) to provide generally pre-cursor equalization and intersymbol interference (ISI) reduction, with adaptation to the first training error signal (e1(n)). When precoding is to be utilized, a decision feedback adaptive filter (DFB) is utilized to determine a second set of coefficients (b(n)) to provide generally post-cursor equalization and ISI reduction, also with adaptation to the first training error signal e1(n). A noise predictor or filter is utilized to determine a third set of coefficients (c(n)) to provide reduction of correlated noise (i.e., noise whitening), with adaptation to the first training error signal e1(n), and with an input of a second training error signal (e2(n)). For circumstances involving data transmission precoding, a fourth set of coefficients (t(n), referred to as Tomlinson coefficients) are then determined as t(n)=b(n)+c(n)+b(n)*c(n), in which "*" denotes a convolution operator.

The received, equalized and noise reduced signal is then input into a trellis decoder, which also operates in a training mode and a data mode. During training mode, the trellis decoder utilizes a symbol decider, to provide a symbol decision utilized in forming the first and second training error signals. During data mode, the trellis decoder decodes a received, equalized and noise reduced data signal, to produce decoded data, to produce the trellis error signal, and to provide a tentative symbol decision utilized in forming the tentative error signal.

The first training error signal e1(n), used for adaptation of the LEQ, DFB and noise predictor, represents a total residual error remaining in the received training signal after both equalization and correlated noise reduction (noise whitening), and is determined as a difference between a symbol decision and the received training signal after equalization and noise whitening. The second training error signal, utilized as input into the noise predictor, represents the error or noise remaining after equalization only, and is determined as a difference between a symbol decision and the received training signal after equalization (but prior to correlated noise reduction).

Significantly, and separate and apart from any transmission-side precoding with the Tomlinson coefficients, the various embodiments also provides adaptive noise whitening during a data transmission mode, with trellis decoding of the received data signal. For continued adaptation of both the linear feedforward equalizer and the noise predictor, the preferred apparatus utilizes a trellis error signal (e3(n−$m_1$)) from the trellis decoder, and in addition, utilizes a tentative error signal (e4(n−$m_2$)) for input into the noise predictor. In the preferred embodiment, $m_1$=$m_2$=1, providing data mode error signals having a delay of one symbol time period.

An additional novel feature of the present invention includes the selection of the trellis and tentative error signals in a trellis decoding environment. Utilizing a path having the smallest cumulative error within the trellis, the apparatus of the present invention selects a previous state, and utilizes the decision or branch error (branch or decision metric) corresponding to that selected state to form the trellis error signal. In the preferred embodiment, the selected state is an immediately previous state (at time t=(n−1), i.e., $m_1$=1), to minimize any delay in the adaptation process.

The tentative error signal is a tentative decision error, and is formed similarly to the second training error signal, but having a delay of one symbol time in the preferred embodiment. More particularly, the tentative error signal is formed as a difference between a tentative symbol decision at time t=(n−$m_2$), and the received data signal subsequent to equalization and filtering (but prior to additional correlated noise reduction) with a corresponding delay of $m_2$. In the preferred embodiment, $m_2$ is also one symbol time period, i.e., $m_2$=1.

The apparatus, method and system for correlated noise reduction of the present invention substantially reduce correlated or non-white noise in data reception and transmission, and provide a significant increase in performance of 1–2 dB. During training mode, the noise predictor provides a third level of signal processing to reduce correlated noise, following two levels of signal processing for equalization, and is readily adaptive, converging quickly to optimal linear filter values without excessive training time, utilizing two distinct training error signals. The various embodiments of the present invention provide noise whitening within a system utilizing a trellis decoder, with or without transmission-side precoding. In addition to providing precoding coefficients, the preferred noise predictor of the present invention also provides adaptive functionality during data transmission in a trellis encoded environment, to adjust to changing noise levels and spectral distributions, utilizing novel trellis and tentative error signals, and is capable of implementation as a linear adaptive filter.

Numerous other advantages and features of the present invention will become readily apparent from the following detailed description of the invention and the embodiments thereof, from the claims and from the accompanying drawings.

BRIEF DESCRIPTION OF THE DRAWINGS

FIG. 12 is an exemplary tabular diagram illustrating improved performance margins under various conditions utilizing the preferred apparatus of the present invention.

DETAILED DESCRIPTION OF THE INVENTION

Figure 1:
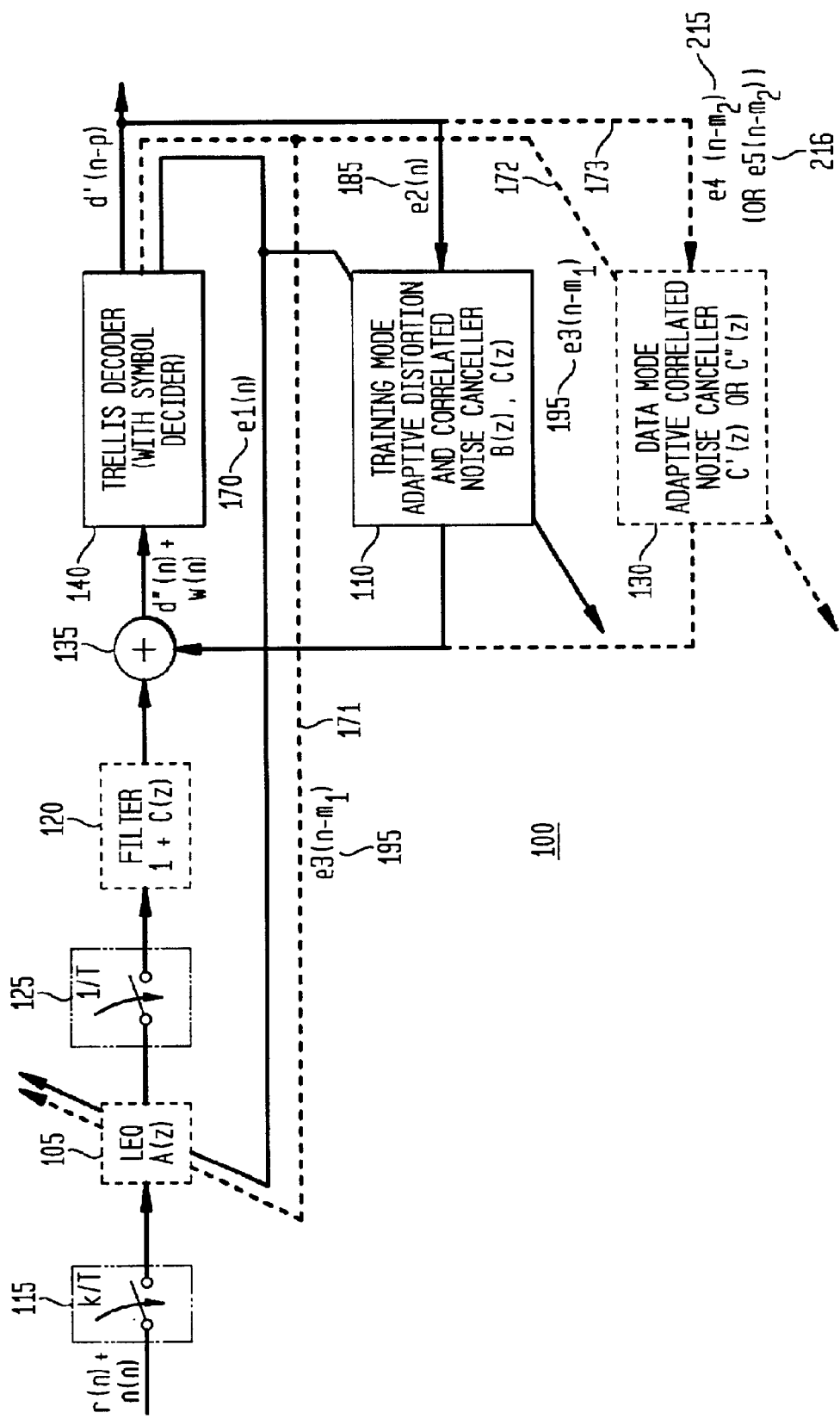
FIG. 1 is a block diagram illustrating a preferred apparatus embodiment in accordance with the present invention.

While the present invention is susceptible of embodiment in many different forms, there are shown in the drawings and will be described herein in detail specific embodiments thereof, with the understanding that the present disclosure is to be considered as an exemplification of the principles of the invention and is not intended to limit the invention to the specific embodiments illustrated.

As mentioned above, a need remains for an apparatus, method and system for correlated noise reduction, to substantially reduce correlated or non-white noise in data reception and transmission. Such an apparatus, method and system for correlated noise reduction are provided in accordance with the present invention, which are readily adaptive, converging quickly to optimal linear filter values without excessive training time, utilizing two distinct training error signals. The apparatus, method and system for correlated noise reduction of the present invention also provide continued adaptation for noise whitening within a system utilizing a trellis decoder, both with or without transmission-side precoding, utilizing distinct trellis and tentative error signals. In addition to providing precoding coefficients, the preferred apparatus, method and system for correlated noise reduction of the present invention also provides adaptive functionality during data transmission, to adjust to changing noise levels and spectral distributions, and utilize a noise predictor capable of implementation as a linear adaptive filter.

FIG. 1 is a block diagram illustrating the preferred apparatus embodiment 100 in accordance with the present invention. Such an apparatus 100 is generally included within a receiver of a data communication device, as discussed below with reference to FIG. 3, and is preferably implemented or embodied as discussed below with reference to FIG. 8. Additional receiver (or transmitter) functionality, as known in the field of data transmission, is not separately illustrated or discussed. As illustrated in FIG. 1, the apparatus 100 integrates or incorporates equalization functionality, with a linear feedforward equalizer or filter ("LEQ") 105, which utilizes a plurality of equalization coefficients a(n), and with a decision feedback adaptive filter ("DFB") (separately illustrated in FIG. 4 as DFB 150), which utilizes a plurality of equalization coefficients b(n), and which is incorporated within the training mode adaptive distortion and correlated noise canceller 110. The LEQ 105 and DFB 150 are typically considered in the art to comprise a decision feedback equalizer. The training mode adaptive distortion and correlated noise canceller 110 is discussed in greater detail below with reference to FIG. 4. An additional linear adaptive filter referred to as a noise predictor, also within the training mode adaptive distortion and correlated noise canceller 110 (separately illustrated in FIGS. 4–7 as noise predictor 160), utilizes a plurality of correlated noise reduction coefficients c(n). The various coefficients a(n), b(n) and c(n) are determined during a training period, based upon the transmission of a training signal as utilized in the prior art, such as a psuedo-random signal consisting of scrambled ones for xDSL. The various equalizers and noise predictor (such as LEQ 105, DFB 150 and noise predictor 160) have corresponding transfer functions A(z), B(z) and C(z), which are z-transforms of the coefficients a(n), b(n) and c(n).

As discussed in greater detail below, the preferred apparatus embodiment 100 utilizes three separate functional elements (or functional blocks) for signal processing during training mode to provide equalization (first and second functional elements) and noise whitening (correlated noise reduction) (third functional element). The first functional element for signal processing, implemented by LEQ 105 preferably as a fractionally-spaced adaptive feedforward filter, generally reduces pre-cursor ISI (and, to some degree, post-cursor ISI). The second functional element for signal processing, implemented by an adaptive feedback filter (also referred to as a decision feedback adaptive filter) within the training mode adaptive distortion and correlated noise canceller 110 (such as DFB 150 in FIG. 4), generally reduces post-cursor ISI. The third functional element for signal processing, implemented by a noise predictor within the training mode adaptive distortion and correlated noise canceller 110 (such as noise predictor 160 in FIG. 4), generally removes correlated noise and whitens the noise spectrum. As discussed in greater detail below with respect to FIGS. 4–7, the present invention utilizes four different error signals to achieve such equalization and noise whitening, two different error signals during a training mode, and two different error signals during a data transmission mode.

The preferred apparatus embodiment 100 of FIG. 1 operates in two modes, an initial training mode, followed by a data transmission mode. (For ease of reference in FIG. 1, components of apparatus 100 which are utilized only during data transmission mode are illustrated utilizing dashed lines). During the training mode, the training mode adaptive distortion and correlated noise canceller 110 is operational, while filter 120, data mode adaptive correlated noise canceller 130 and decoder functionality (within trellis decoder 140) are bypassed, with only a symbol decider functionality (without decoder functionality) utilized within the trellis decoder 140. During data mode, filter 120, data mode adaptive correlated noise canceller 130 and the decoder functionality of trellis decoder 140 are operational, while the training mode adaptive distortion and correlated noise canceller 110 and symbol decider functionality (of the trellis decoder 140) are bypassed or non-operational. For both training and data modes, the output of the trellis decoder 140 is a best estimate of the transmitted symbol and has a transmission delay of "p" symbols (d'(n–p)). Additional variations are illustrated for data modes in a precoding environment (FIGS. 5 and 6) and in a non-precoding environment (FIG. 7).

Referring to FIG. 1, a received signal, typically with intersymbol interference ("ISI") and with additive noise such as crosstalk and residual echo (r(n)+n(n)), is sampled (115), preferably at a rate of k/T (where 1/T is the data symbol rate (T is the data symbol period), and k is a positive integer greater than one, with such sampling also referred to as "fractionally spaced" sampling), but equivalently may also be sampled at a rate of 1/T. The sampled (k/T or 1/T) signal is input into LEQ 105 for initial equalization to remove predominantly pre-cursor intersymbol interference (ISI) (with transfer function A(z) and coefficients a(n)). In the preferred embodiment, if the received signal was sampled at a rate k/T (with k>1), then the output of LEQ 105 is down sampled (125) to a rate of 1/T (referred to as symbol spaced sampling), in accordance with the present invention, to provide one sample per symbol time. In data transmission mode, the down sampled output of LEQ 105 is further multiplied by the transfer function (1+C(z)) in filter 120 (in which the transfer function C(z) is determined as discussed below). In training mode, the filter 120 is bypassed. During the training mode, this output (from down sampled (125) LEQ 105) is combined (in summer 135) with the output of the training mode adaptive distortion and correlated noise canceller 110 (having transfer functions B(z) and C(z)), with coefficients b(n) and c(n) being trained to converge to particular values, for subsequent transmission as Tomlinson coefficients (T(n)), as discussed in greater detail below with respect to FIG. 4). During a data transmission mode subsequent to the training mode, the down sampled (125) and filtered (120) output is combined (also in summer 135) with the output of the data mode adaptive correlated noise canceller 130, discussed in greater detail below with reference to FIGS. 5 and 6. The adaptive correlated noise canceller 130 is utilized, in the preferred embodiment, to continue to allow the apparatus 100 to adapt to potentially changing noise conditions following training, during data transmission (data mode).

The output of such combining from summer 135 (referred to as d"(n) and w(n) (whitened noise) in FIG. 1) is input into a trellis decoder 140 (which also preferably includes a modulo function), to produce a decoded output (d'(n−p) in FIG. 1) in data transmission mode. During training mode, as discussed in greater detail below, the decoder functionality of trellis decoder 140 is bypassed and is replaced by a symbol decider (or slicer), such as symbol decider 165 in FIG. 4, to produce estimated decisions (d'(n)) to determine various equalization taps (coefficients a(n) and b(n)) and the correlated noise reduction coefficients c(n).

Continuing to refer to FIG. 1, and of significance in the present invention, the apparatus 100 operates in two modes, a training mode (utilizing the training mode adaptive distortion and correlated noise canceller 110) and a data mode (utilizing the adaptive correlated noise canceller 130). During training, the various coefficients a(n), b(n) and c(n) are determined initially. For subsequent precoding during data mode, the coefficients b(n) and c(n) are transmitted to a transmitter (FIG. 2), preferably in the form of one set of coefficients t(n) resulting from the additions and convolution of b(n)+c(n)+b(n)*c(n) (or, equivalently in z-transform domain, T(z)=B(z)+C(z)+B(z)·C(z)). As discussed in greater detail below, during data mode, coefficients a(n) and an updated c(n), c'(n) or c"(n) continue to adapt to potentially changing channel and noise conditions. Additionally, in FIG. 7, another data mode is illustrated for use in a non-precoding environment.

As illustrated in FIG. 1, four different error signals are utilized in the preferred embodiment. Two error signals, first training error signal e1(n) 170 and second training error signal e2(n) 185, are utilized in the training mode, and two other error signals, trellis error signal e3(n−$m_1$) 195 and tentative error signal e4(n−$m_2$) 215, are utilized in the data transmission mode. (In non-precoding data communication environments, a fifth error signal e5(n−$m_2$) 216 (formed similarly to the tentative error signal 215) is used in place of the tentative error signal 215).

The first training error signal e1(n) 170 is used during the training mode for adaptation of the LEQ 105, and the DFB and noise predictor in the training mode adaptive distortion and correlated noise canceller 110, and represents a total residual error remaining in the received training signal after equalization and correlated noise reduction. The first training error signal e1(n) 170 is determined as a difference between a symbol decision (from trellis decoder 140) and the received training signal after equalization and correlated noise reduction (illustrated in greater detail with reference to FIG. 4). The second training error signal in training mode, utilized as input into the noise predictor in the training mode adaptive distortion and correlated noise canceller 110, represents the error or noise remaining after equalization only, and is determined as a difference between a symbol decision and the received training signal after equalization (but prior to correlated noise reduction).

Significantly, and separate and apart from any transmission-side precoding with Tomlinson coefficients, the apparatus 100 also provides adaptive correlated noise reduction during a data transmission mode, with trellis decoding of the received data signal. For continued adaptation of both the linear feedforward equalizer and the noise predictor, the preferred apparatus 100 utilizes a trellis error signal (e3(n−$m_1$)) (on dashed lines 171 and 172), and in addition, for input into the noise predictor of the data mode adaptive correlated noise canceller 130, the preferred apparatus 100 utilizes a tentative error signal (e4(n−$m_2$) or e5(n−$m_2$) on dashed line 173). In the preferred embodiment, $m_1$=$m_2$=1, providing data mode error signals having a delay of one symbol time period. The use of the trellis and tentative error signals is discussed in greater detail below with reference to FIGS. 5, 6 and 7.

An additional novel feature of the present invention includes the selection of the trellis and tentative error signals in a trellis decoding environment. During the decoding process, the trellis decoder 140 selects a path having a smallest cumulative (path) error within the trellis. The trellis decoder 140 of the present invention then selects a previous state within that path, and utilizes a branch or decision error (represented as a current branch metric or decision error) corresponding to the selected state to form the trellis error signal e3(n−$m_1$) 195. In the preferred embodiment, the selected state is an immediately previous state (at time t=(n−1), i.e., $m_1$=1) to minimize delay in the adaptation process. For other embodiments, the selected previous state may incorporate greater delay (i.e., $m_1$>1).

The tentative error signal (e4(n−$m_2$) 215 or e5(n−$m_2$) 216) is a tentative decision error, and is formed similarly to the second training error signal, but having a delay of one symbol time in the preferred embodiment (i.e., $m_2$=1). More particularly, the tentative error signal 215 is formed as a difference between a tentative symbol decision at time t=(n−$m_2$), and the received data signal subsequent to equalization and filtering (but prior to additional correlated noise reduction) with a corresponding delay of $m_2$ symbol time periods. (It should be noted that the values of $m_1$ and $m_2$ may be selected independently, i.e., $m_1$ does not necessarily equal $m_2$ and, moreover, $m_1$ should be greater than or equal to $m_2$, for all cases or for all embodiments).

Also significant in the present invention is the possible use of two different sampling rates, fractional rate sampling (k/T, with k>1) and non-fractional or symbol rate sampling (1/T), with fractional rate sampling generally for pre-cursor equalization, and with non-fractional or symbol rate sampling generally for post-cursor equalization and correlated noise reduction. The selection of the value of k (with k being a positive integer) depends upon the selected system environment. For example, for many environments where a significant portion of the spectrum of the transmitted signal is less than one-half the sampling rate (the Nyquist rate or frequency), then k may equal 1; conversely, where the spectrum of the transmitted signal is wider, increased performance may be obtained when k is selected to be greater than 1.

In accordance with the preferred embodiment of the present invention, therefore, the pre-cursor equalization functionality utilizes fractional rate (k/T) sampling while the correlated noise reduction and post-cursor equalization functionalities utilize the (down sampled) symbol or non-fractional rate (1/T). As a result, all three sets of coefficients converge with reasonable rapidity. In addition, use of the correlated noise reduction apparatus of the present invention results in an overall gain of 1.5 to 2 dB in noise margins in crosstalk environments, and an improved bit error rate (BER) in trellis code modulation systems which are highly sensitive to correlated noise.

Figure 2:
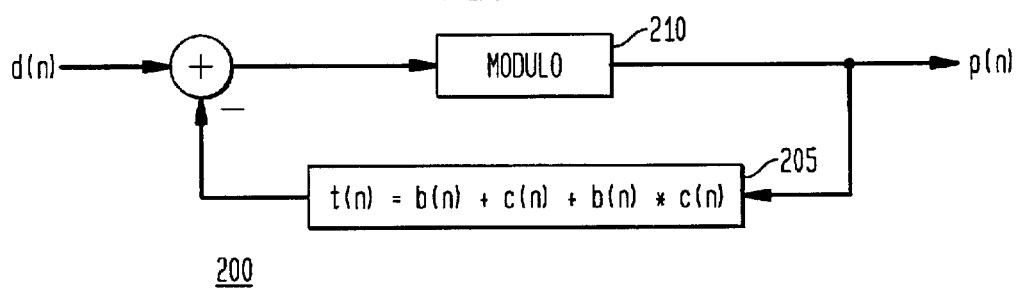
FIG. 2 is a block diagram illustrating a transmitter utilizing coefficients determined by an apparatus embodiment in accordance with the present invention.

FIG. 2 is a block diagram illustrating a transmitter 200 utilizing coefficients determined by an apparatus in accordance with the present invention. As illustrated in FIG. 2, a data stream d(n) for transmission (to the apparatus 100) is precoded (or predistorted) with the coefficients t(n) resulting from (b(n)+c(n)+b(n)*c(n)) (block 205), followed by modulo function 210, resulting in precoded data p(n) for transmission. As discussed below, the coefficients t(n) may be calculated by the transmitter 200, based upon b(n) and c(n) transferred from a receiver; or equivalently, a receiver may calculate t(n) from the b(n) and c(n) coefficients it has also determined, and transfer the resulting t(n) coefficients to the transmitter 200 (as discussed below).

Figure 3:
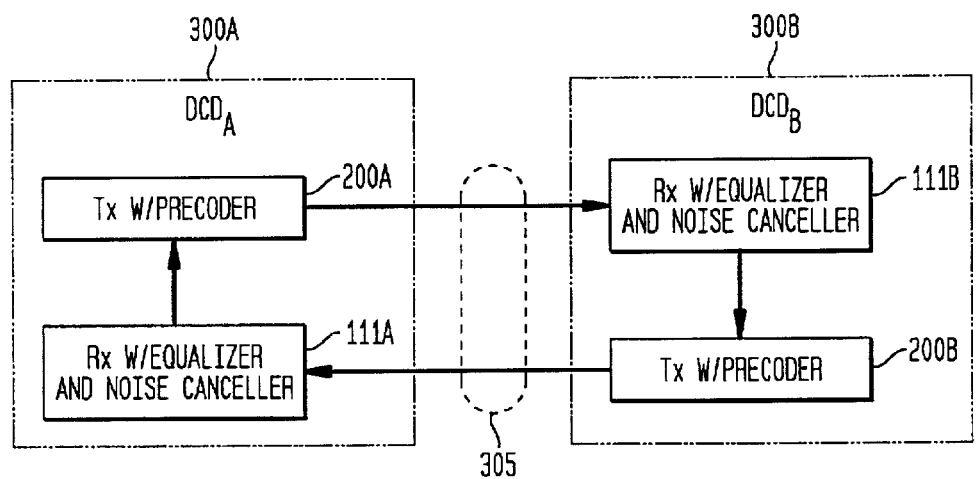
FIG. 3 is a block diagram illustrating a system of data communication devices for an exchange of correlated noise reduction and equalization coefficients in accordance with the present invention.

FIG. 3 is a block diagram illustrating a system of data communication devices 300 for an exchange of correlated noise reduction and equalization coefficients in accordance with the present invention. As illustrated in FIG. 3, during a training mode, each transmitter 200A and 200B transmits a training signal to each corresponding receiver 111B and 111A, respectively, in the other DCD 300, via a bi-directional communication channel 305, such as a twisted-pair cable. For example, the transmitter 200B in DCD 300B transmits a training signal, such as scrambled ones, to receiver 111A in DCD 300A. The equalizer and noise canceller in the receiver 111A, in accordance with the present invention, determines coefficients a(n), b(n) and c(n), and further determines a set of correlated noise reduction and equalization coefficients (Tomlinson coefficients) t(n) equal to b(n)+c(n)+b(n)*c(n). The receiver 111A then transfers these correlated noise reduction and equalization (t(n)) coefficients to its transmitter 200A, for transmission over channel 305 to the receiver 111B of DCD 300B. The receiver 111B, in turn, transfers these correlated noise reduction and equalization coefficients (t(n)=b(n)+c(n)+b(n)*c(n)) to its transmitter 200B, for use in subsequent transmissions to receiver 111A. Equivalently, the coefficients b(n) and c(n) may be transferred directly from the receiver 111A, with the addition and convolution steps b(n)+c(n)+b(n)*c(n) performed by the DCD 300B to determine the coefficients t(n) for use in its transmitter 200B.

Reciprocally, the transmitter 200A in DCD 300A transmits a training signal, such as scrambled ones, to receiver 111B in DCD 300B. The equalizer and noise canceller in the receiver 111B, in accordance with the present invention, determines its own coefficients a(n), b(n) and c(n), and further determines a set of correlated noise reduction and equalization coefficients (Tomlinson coefficients) t(n) equal to b(n)+c(n)+b(n)*c(n). The receiver 111B then transfers these correlated noise reduction and equalization (t(n)) coefficients to its transmitter 200B, for transmission over channel 305 to the receiver 111A of DCD 300A. The receiver 111A, in turn, transfers these correlated noise reduction and equalization coefficients (t(n)=b(n)+c(n)+b(n)*c(n)) to its transmitter 200A, for use in subsequent transmissions to receiver 111B. Equivalently, the coefficients b(n) and c(n) may be transferred directly from the receiver 111B, with the addition and convolution steps b(n)+c(n)+b(n)*c(n) performed by the DCD 300A to determine the coefficients t(n) for use by its transmitter 200A. In general, the sets of correlated noise reduction and equalization coefficients (t(n)=b(n)+c(n)+b(n)*c(n)) determined by each receiver 111A and 111B generally will not be identical.

Figure 4:
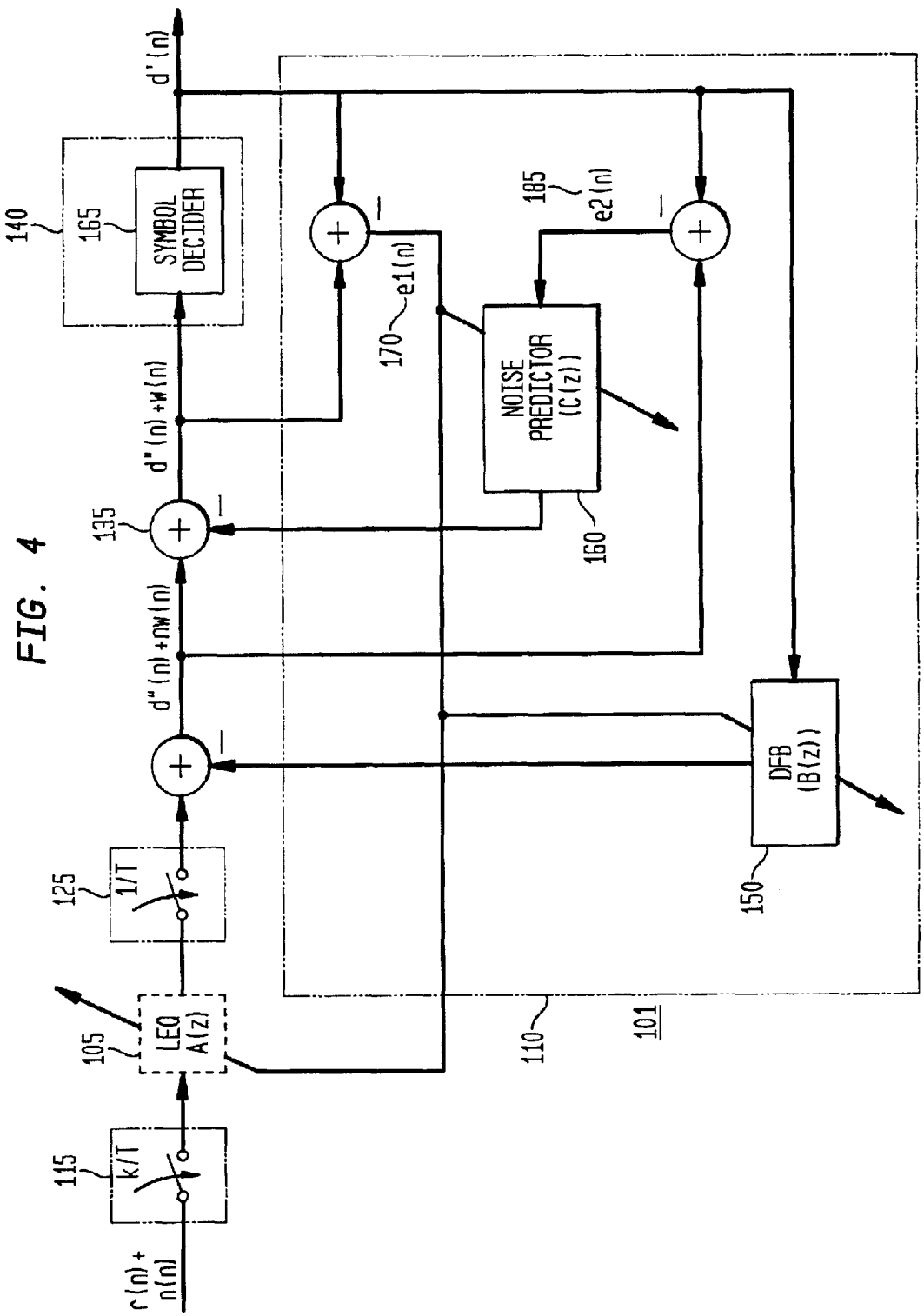
FIG. 4 is a block diagram illustrating a first preferred apparatus embodiment during training mode in accordance with the present invention.

FIG. 4 is a block diagram illustrating a first, preferred apparatus 101 during training mode in accordance with the present invention. As illustrated in FIG. 4, the training mode adaptive distortion and correlated noise canceller 110 includes a decision feedback adaptive filter (or equalizer) ("DFB") 150, operational only during training mode, and a noise predictor 160 (implemented as a linear adaptive filter), operational during both training and data modes. The DFB 150 is utilized to determine the equalization coefficients b(n), and the noise predictor 160 is utilized to determine the correlated noise reduction coefficients c(n). As mentioned above, during training mode, the decoder functionality of trellis decoder 140 is not operative and, instead, a symbol decider (or slicer) 165 (within trellis decoder 140 of FIGS. 1 and 4) is utilized to determine a value of a given symbol, resulting in a symbol decision d'(n), for each symbol, as a best estimate of the transmitted symbol d(n). The LEQ 105 is utilized to determine the a(n) equalization coefficients, to eliminate ISI and to determine cursor (or slicer) location (the location in a received symbol utilized for sampling and decision). (In the art, LEQ 105 as an adaptive feedforward filter and DFB 150 as an adaptive feedback filter are typically considered to form a decision feedback equalizer (DFE), without any correlated noise reduction function of the present invention, however).

Continuing to refer to FIG. 4, the equalizers, both LEQ 105 and DFB 150, and the noise predictor 160, in accordance with the present invention, are each trained with adaptation to a first training error signal 170, e1(n), typically referred to as "slicer" error, which is an error signal formed from the difference between the output and input of the symbol decider 165, i.e., the difference between the symbol decision (d'(n)) and the received training signal after both equalization and correlated noise reduction (d"(n) plus whitened noise w(n)). Through the training process, the equalizers LEQ 105 and DFB 150, and the noise predictor 160, adjust their respective coefficients a(n), b(n) and c(n) to minimize the first training error signal 170, e1(n), and drive it to zero (approximately). In the preferred embodiment, the noise predictor 160 is implemented as a linear adaptive filter, and also utilizes a least mean square error algorithm to determine its coefficients and minimize the first training error signal 170.

The input into the LEQ 105 is a received and k/T sampled signal, plus the first training error signal 170 for adaptation. The input into the DFB 150 is the symbol decision d'(n), plus the first training error signal 170 for adaptation. In accordance with the present invention, however, the input to the noise predictor 160 is a second training error signal 185, e2(n), which is an error signal formed from the difference between the symbol decision (d'(n)) and the received training signal after only equalization (d"(n) plus additive noise nw(n)), prior to any noise whitening (correlated noise reduction). (Without the noise predictor 160, e1(n) would equal e2(n)). This use of the second training error signal e2(n), which includes correlated noise, as input into the noise predictor 160, with the adaptation to the first training error signal, generates the correlated noise reduction coefficients c(n) of the present invention, for subsequent correlated noise reduction (noise whitening) during data transmission.

As mentioned above, following determination of the various equalization and correlated noise reduction coefficients a(n), b(n) and c(n) during a training period, the coefficients b(n) and c(n) are transferred to a corresponding transmitter, for use as Tomlinson coefficients for precoding. The coefficients may be transferred as either coefficients b(n) and c(n), or as t(n)=b(n)+c(n)+b(n)*c(n). Following these determinations and the transfer of coefficients for use in precoding, in the preferred embodiment, for low bit error rates in a precoding environment, the c(n) coefficients within the noise predictor 160 are reset or re-initialized to zero, to function as new, adaptive correlated noise reduction coefficients c'(n) for use during data transmission mode, as discussed below with reference to FIGS. 5. For higher bit error rates, the correlated noise reduction coefficients are not reset to zero, and continue to adapt for use during data transmission (c"(n) in FIG. 6). In addition, for non-precoding environments, another apparatus for correlated noise reduction is illustrated in FIG. 7, for both training and data modes.

Figure 5:
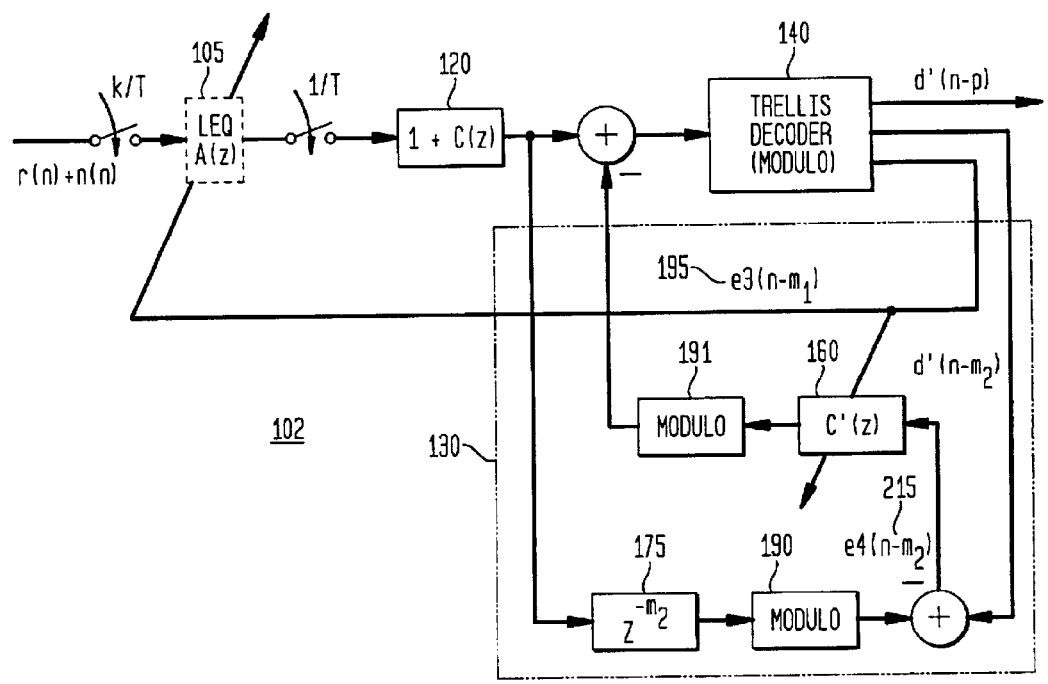
FIG. 5 is a block diagram illustrating a second preferred apparatus embodiment during data transmission mode, with data transmission precoding, in accordance with the present invention.

FIG. 5 is a block diagram illustrating a second preferred apparatus 102 during data transmission mode, with data transmission precoding, in accordance with the present invention. As mentioned above, during data transmission mode, the training mode adaptive distortion and correlated noise canceller 110 is no longer used (with the b(n) and c(n) coefficients used in transmission-side precoding), and instead, the data mode adaptive correlated noise canceller 130 is utilized for ongoing adaptation to potentially changing noise conditions. The correlated noise reduction coefficients of the noise predictor 160 (within the data mode adaptive correlated noise canceller 130) are reset to zero, and for data transmission, are continuously updated to track changes and variations in the noise environment over time, and are referred to herein as data mode correlated noise reduction coefficients c'(n). The original c(n) coefficients do, however, continue to be used in filter 120, within the transfer function (1+C(z)). Modulo function blocks 190, 191 and symbol delay block 175 may be implemented as known in the art. The structure illustrated in FIG. 5 is used when the bit error rate is generally less than $10^{-7}$ in the preferred embodiment, to avoid possible divergence of the correlated noise reduction coefficients c'(n). In general, for any particular embodiment, a bit error rate threshold may be determined based upon the amount of coding gain and the amount of delay $m_2$.

For continued adaptation of both the linear feedforward equalizer 105 and the noise predictor 160, the preferred apparatus 102 utilizes a trellis error signal (e3(n−$m_1$)) 195 from the trellis decoder 140 (which also includes a modulo functionality), and in addition, utilizes a tentative error signal (e4(n−$m_2$)) 215 for input into the noise predictor 160. The parameters $m_1$ and $m_2$ are modifiable, with $m_1$ greater than or equal to $m_2$, and in the preferred embodiment, $m_1$=$m_2$=1, providing trellis and tentative error signals having a delay of one unit symbol time period (with symbol delay block 175 also providing a unit symbol delay ($m_2$=1)).

The selection of the trellis and tentative error signals in a trellis decoding environment, in accordance with the present invention, is unique. Utilizing a path having a smallest cumulative error within the trellis, the trellis decoder 140 selects a previous state, and utilizes the decision error (i.e., current branch metric or branch error), corresponding to that selected state to form the trellis error signal (e3(n−$m_1$) 195. More specifically, the trellis error signal is equal to a branch or decision error (or branch/decision metric) of a previous state, with the previous state selected from the path (or trace) having the smallest cumulative error. As known in the art, and in the preferred embodiment, such a decision or branch error is determined as the square of the absolute value of the difference between the received data signal (after equalization and correlated noise reduction) and a selected constellation point. For example, in the event of a received data signal (after equalization and correlated noise reduction) equal to −4.328 V and a selected constellation point of −5 V, the branch or decision error (or metric) would be equal to $|-4.328+5|^2$. There are myriad other equivalent methods which may be utilized to determine the branch or decision error, however. In addition, in the preferred embodiment, the selected state is an immediately previous state on the path having the least cumulative error (selected at time t=(n−1), i.e., $m_1$=1). Both the LEQ 105 and the noise predictor 160 (with data mode correlated noise reduction coefficients c'(n)) adapt to the trellis error signal, attempting to force the branch or decision error, of previous states along the minimum error path (minimum cumulative error), to zero (approximately). While $m_1$=1 in the preferred embodiment, in general, $m_1$ is selected as a compromise between accuracy and adaptation rate, as when $m_1$ is larger, error is less, but delay is increased and the adaptation rate is slower.

The tentative error signal (e4(n−$m_2$) 215) is a tentative decision error, and is formed similarly to the second training error signal, but having a delay of one symbol time in the preferred embodiment. More particularly, the tentative error signal is formed as a difference between a tentative symbol decision at time t=(n−$m_2$), d'(n−$m_2$) (preferably with $m_2$=1), as output from the trellis decoder 140, and the received data signal subsequent to equalization and filtering, and prior to additional noise whitening (as output from filter 120, with a corresponding delay of one symbol time period from symbol delay block 175 (with $m_2$=1) and modulo function block 190). While $m_2$=1 in the preferred embodiment, in general, $m_2$ is selected as a compromise between accuracy of the tentative decisions and the ability to remove correlations between nearby samples, as when $m_2$ is larger, error may be less, but correlations cannot be cancelled between samples that are separated by less than $m_2$+1.

Of particular significance, utilizing the various apparatuses 102, 103 (FIG. 6) or 104 (FIG. 7) during data transmission mode, in accordance with the present invention, to update the equalization and correlated noise reduction coefficients a(n) and c(n) (or c'(n) or c"(n)), avoids a problem typically encountered in the prior art. In the prior art, the various data communication devices must retrain in the event of changing noise conditions, resulting in ceasing data transmission, training again, followed by resuming data transmission. With the coefficient update provided during data transmission mode with the present invention, such prior art retraining is avoided, with data transmission effectively continuing uninterrupted.

Figure 6:
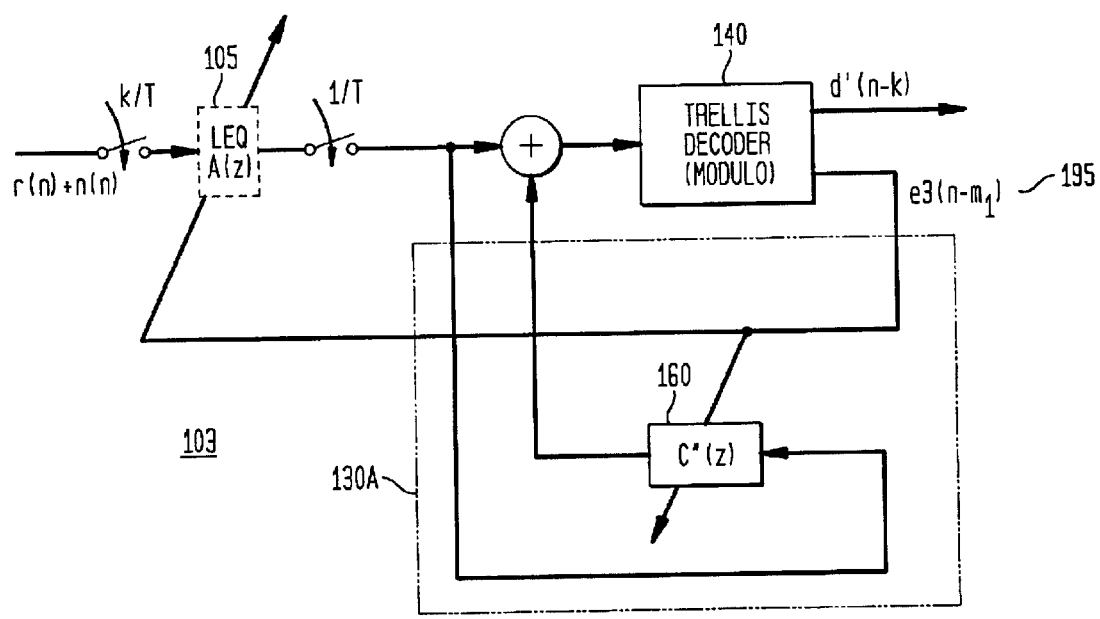
FIG. 6 is a block diagram illustrating a third preferred apparatus embodiment during data transmission mode, with data transmission precoding, in accordance with the present invention.
Figure 7:
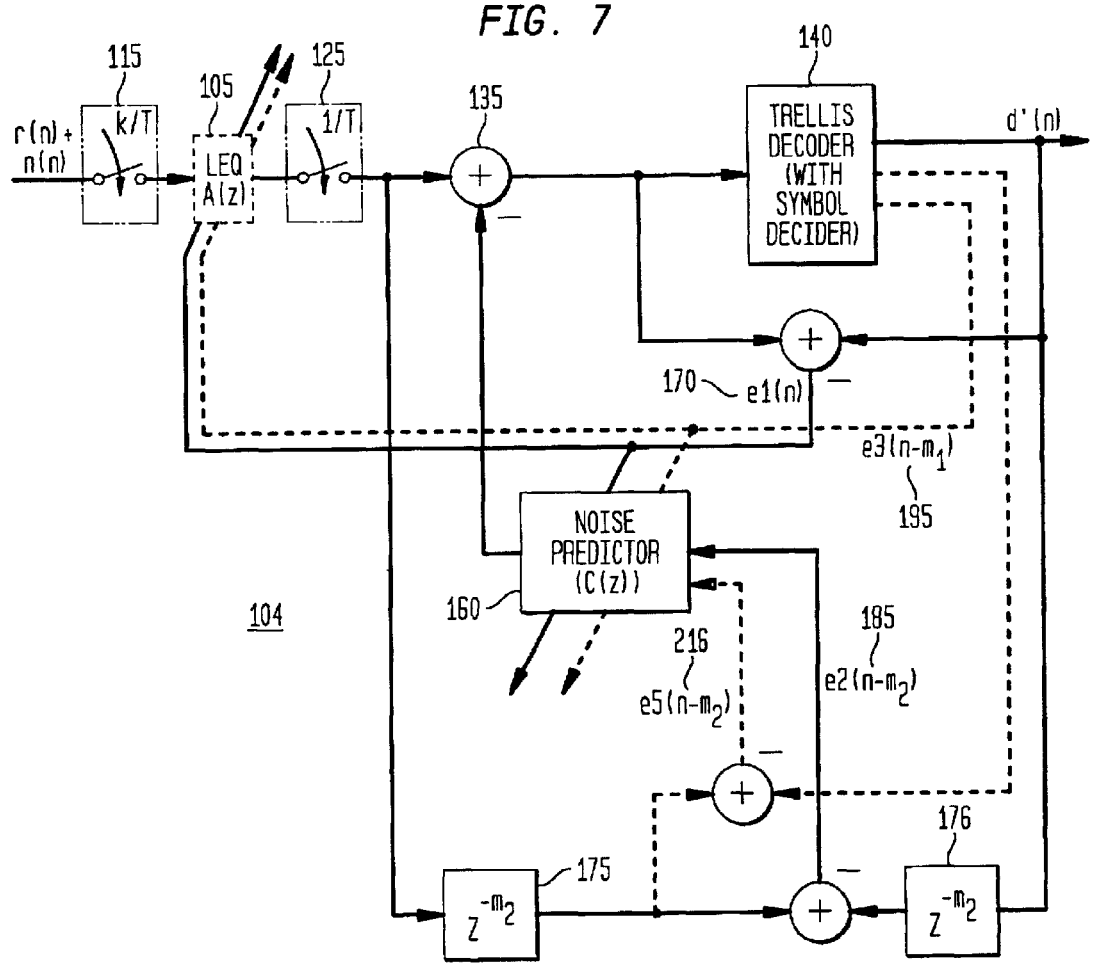
FIG. 7 is a block diagram illustrating a fourth apparatus embodiment for non-precoding data communications applications, during training and data transmission modes, in accordance with the present invention.

FIG. 6 is a block diagram illustrating a third preferred noise canceller apparatus 103 during data transmission mode, with data transmission precoding, in accordance with the present invention. The structure illustrated in FIG. 6, utilizing data mode adaptive correlated noise canceller 130A (with noise predictor 160) and bypassing (1+C(z)) filter 120 (of FIGS. 1 and 5), is used when the bit error rate is generally greater than $10^{-7}$, as it is not sensitive to feedback decision error and provides an alternative means of adaptation to track error which may be introduced, for example, due to temperature variations. In this case, the correlated noise reduction coefficients c(n) of the noise predictor 160 (within the data mode adaptive correlated noise canceller 130A) are not reset to zero; for data transmission, the correlated noise reduction coefficients are continuously updated to track changes and variations in the noise environment over time, as data mode correlated noise reduction coefficients c"(n). As in the structure of FIG. 5, the LEQ 105 and noise predictor 160 adapt to the trellis error signal, attempting to force the branch or decision error, of previous states along the minimum error path (minimum cumulative error), to zero. No tentative error signal is utilized in this embodiment, and instead, the input to the noise predictor 160 is the received signal after equalization by LEQ 105. Alternatively in this embodiment, the adaptation of noise predictor 160 may be held constant (static), with the noise predictor 160 used to implement a finite impulse response (FIR) filter.

FIG. 7 is a block diagram illustrating a fourth noise canceller apparatus 104 for additional, non-precoding data communications applications, in accordance with the present invention. The apparatus 104 may be utilized during both training and data transmission modes, and in trellis encoded applications. In non-precoding data communications applications, DFB 150 is not utilized and, as a consequence, in the preferred embodiment, noise predictor 160 may be implemented as a longer adaptive filter. In addition, during data transmission mode, (1+C(z)) filter 120 is not utilized.

During a training period, both LEQ 105 and noise predictor 160 adapt to the first training error signal e1(n) 170, with the second training error signal (e2(n−$m_2$)) 185 providing input into the noise predictor 160, generating equalization and correlated noise reduction coefficients a(n) and c(n), respectively. The second training error signal (e2(n−$m_2$)) 185 is a delayed error signal, where the delay $m_2$ (of blocks 175 and 176) matches the trellis 140 look-back depth of the data mode. Following such training, the correlated noise reduction coefficients c(n) of the noise predictor 160 are not reset to zero; for data transmission, the correlated noise reduction coefficients are continuously updated to track changes and variations in the noise environment over time. During data transmission mode (dashed lines), both LEQ 105 and noise predictor 160 adapt to the trellis error signal e3(n−$m_1$) 195, with a fifth error signal e5(n−$m_2$) 216 providing input into the noise predictor 160. As in FIG. 5, the trellis error signal 195 is also is equal to a branch or decision error (or branch metric) of a previous state, with the (immediately ($m_1$=1)) previous state selected by trellis decoder 140 from the path (or trace) having the smallest cumulative error. The fifth error signal 216 is formed similarly to the tentative error signal, differing insofar as filter 120 and corresponding modulo function 190 are not implemented in apparatus 104. More particularly, the fifth error signal is also formed as a difference between a tentative symbol decision at time t=(n−$m_2$), d'(n−$m_2$) (with $m_2$=1), as output from the decoder 140, and the received data signal subsequent to equalization (as output from LEQ 105 and sampler 125, but prior to additional noise whitening) also with a corresponding delay of $m_2$ symbol time periods from symbol delay block 175 (preferably with $m_2$=1)). As a consequence, the fifth error signal 216 and the tentative error signal 215 are functionally equivalent, and may be considered interchangeable herein.

Figure 8:
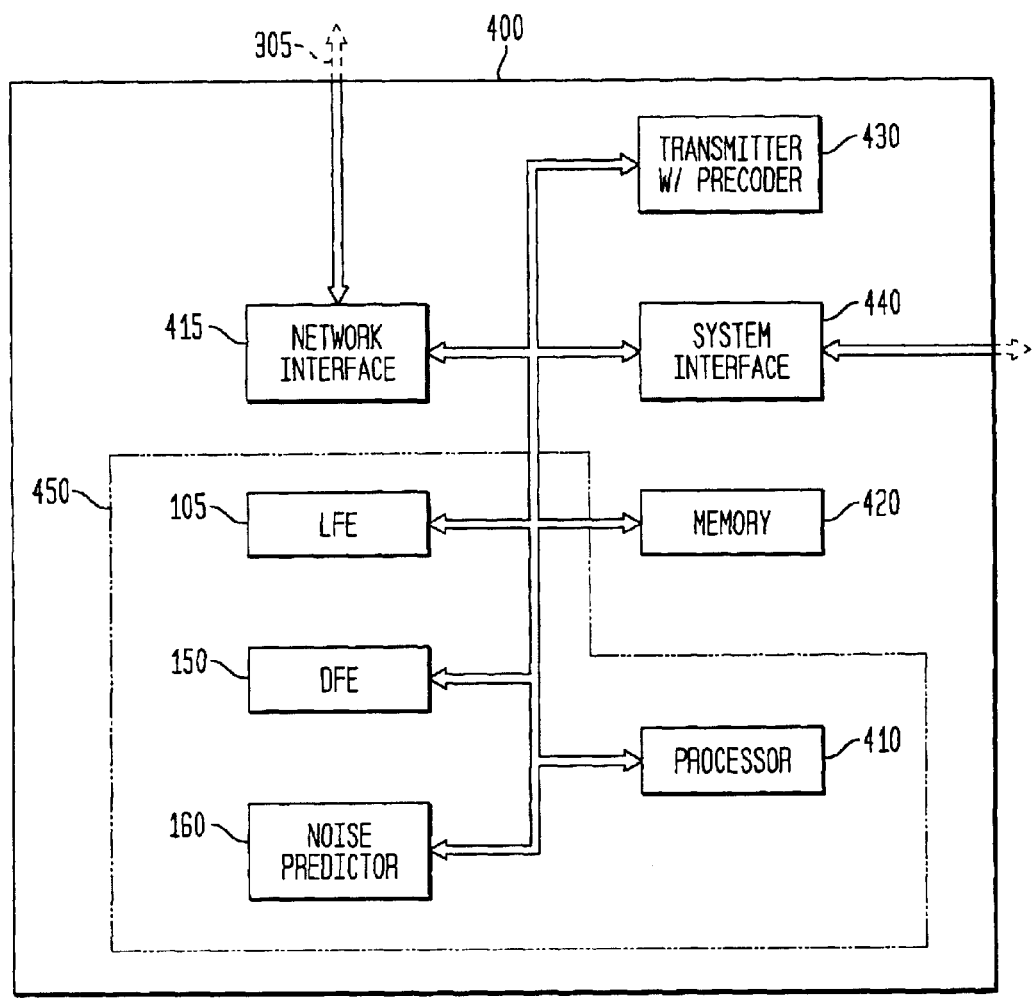
FIG. 8 is a block diagram illustrating a preferred data communication device embodiment in accordance with the present invention.

FIG. 8 is a block diagram illustrating a preferred data communication device embodiment 400 of the noise canceller apparatus in accordance with the present invention. The data communication device 400 is typically coupled or connected via a channel 305 to a network, which may be any type of network, such as a local loop or a public switched telephone network (PSTN), which provides further connections to other data communication devices. The channel 305 is preferably one or more twisted pairs of copper wire, but also may be any other type of medium, such as coaxial cable or fiber optic cable. The data communication device 400 receives and transmits encoded (and modulated) data, respectively from and to one or more other data communication devices, via a network.

The data communication device 400 includes a network interface 415, a processor 410, a memory 420, a transmitter (with precoder) 430, a system interface 440, equalizers LEQ 105 and DFB 150, and noise predictor 160. The equalizers LEQ 105 and DFB 150, the noise predictor 160, and the processor 410, in the preferred embodiment, implement or embody the apparatus (450) of the present invention. The apparatus 450, with the network interface (comprising a receiver), with the transmitter 430, comprise a system of the present invention. The network interface 415 is utilized to receive and transmit information and other data, control messages, and other pertinent information, to and from a network, and is typically designed to interface with a selected type of channel 305 (such as twisted pair). Depending upon the data communication protocol to be implemented, the network interface 415 may also include a modulator and a demodulator, such as to implement quadrature amplitude modulation. The system interface 440 is utilized to communicate with a user device, such as a computer or a local area network, and provides decoded data to a user device or receives data for transmission. The data communication device 400 also includes a transmitter (with a precoder) 430, as discussed above. For non-precoding environments, such as for the structure of FIG. 7, transmitter 430 may be implemented without a precoder.

The data communication device 400 also includes a processor 410 and a memory 420. The memory 420 is preferably an integrated circuit (such as random access memory (RAM) in any of its various forms), but also may be a magnetic hard drive, an optical storage device, or any other type of data storage apparatus. The memory 420 is used to store information obtained during the correlated noise reduction process, such as the various correlated noise reduction and equalization coefficients a(n), b(n), c(n), and c'(n) or c"(n), the Tomlinson coefficients t(n), other information utilized within the decoding process, such as path and branch metrics, and also may store information pertaining to program instructions or configurations, if any (discussed below). The equalizers LEQ 105 and DFB 150, and the noise predictor 160, are implemented as discussed above.

Continuing to refer to FIG. 8, the processor 410 may include a single integrated circuit ("IC"), or may include a plurality of integrated circuits or other components connected, arranged or grouped together, such as microprocessors, digital signal processors ("DSPs"), custom ICs, application specific integrated circuits ("ASICs"), field programmable gate arrays ("FPGAs"), associated memory (such as RAM and ROM), and other ICs and components. As a consequence, as used herein, the term processor should be understood to equivalently mean and include a single IC, or arrangement of custom ICs, ASICs, processors, microprocessors, controllers, FPGAs, or some other grouping of integrated circuits which perform the functions discussed above with reference to FIGS. 1–7, and also discussed below with reference to FIG. 9, with associated memory, such as microprocessor memory or additional RAM, DRAM, SRAM, MRAM, ROM, EPROM or $E^2$PROM. The processor 410 with its associated memory may be configured (via programming or hard-wiring) to perform the methodology of the invention, as discussed above with reference to FIGS. 1–7, and as discussed below with reference to FIG. 9. For example, the methodology may be programmed and stored, in the processor 410 with its associated memory (and/or memory 420) and other equivalent components, as a set of program instructions (or equivalent configuration or other program) for subsequent execution when the processor 410 is operative (i.e., powered on and functioning). Equivalently, when the processor 410 with its associated memory and other equivalent components are implemented in whole or part as FPGAs, custom ICs and/or ASICs, the FPGAs, custom ICs or ASICs also may be designed, configured and/or hard-wired to implement the methodology of the invention. In the preferred embodiment, the processor 410 may be implemented in its entirety as an ASIC and/or as a DSP, which are configured (hard-wired) through its design (such as gate and interconnection layout) and/or program instructions to implement the methodology of the invention, and to include the memory 420. In the preferred embodiment, the functions performed by the processor 410 may include trellis decoding (trellis decoder 140), symbol decision (slicing) during training (symbol decider 165 of trellis decoder 140), all of the various mathematical functions such as the addition (summer 135) and multiplication steps discussed above (e.g., functions of the summer 135, (1+C(z)) filter 120, the determination of Tomlinson coefficients $t(n)=b(n)+c(n)+b(n)*c(n)$), modulo and delay functions, path and branch metric determination, and all other digital signal processing functions which may occur in the equalization and correlated noise reduction functions discussed above.

Figure 9:
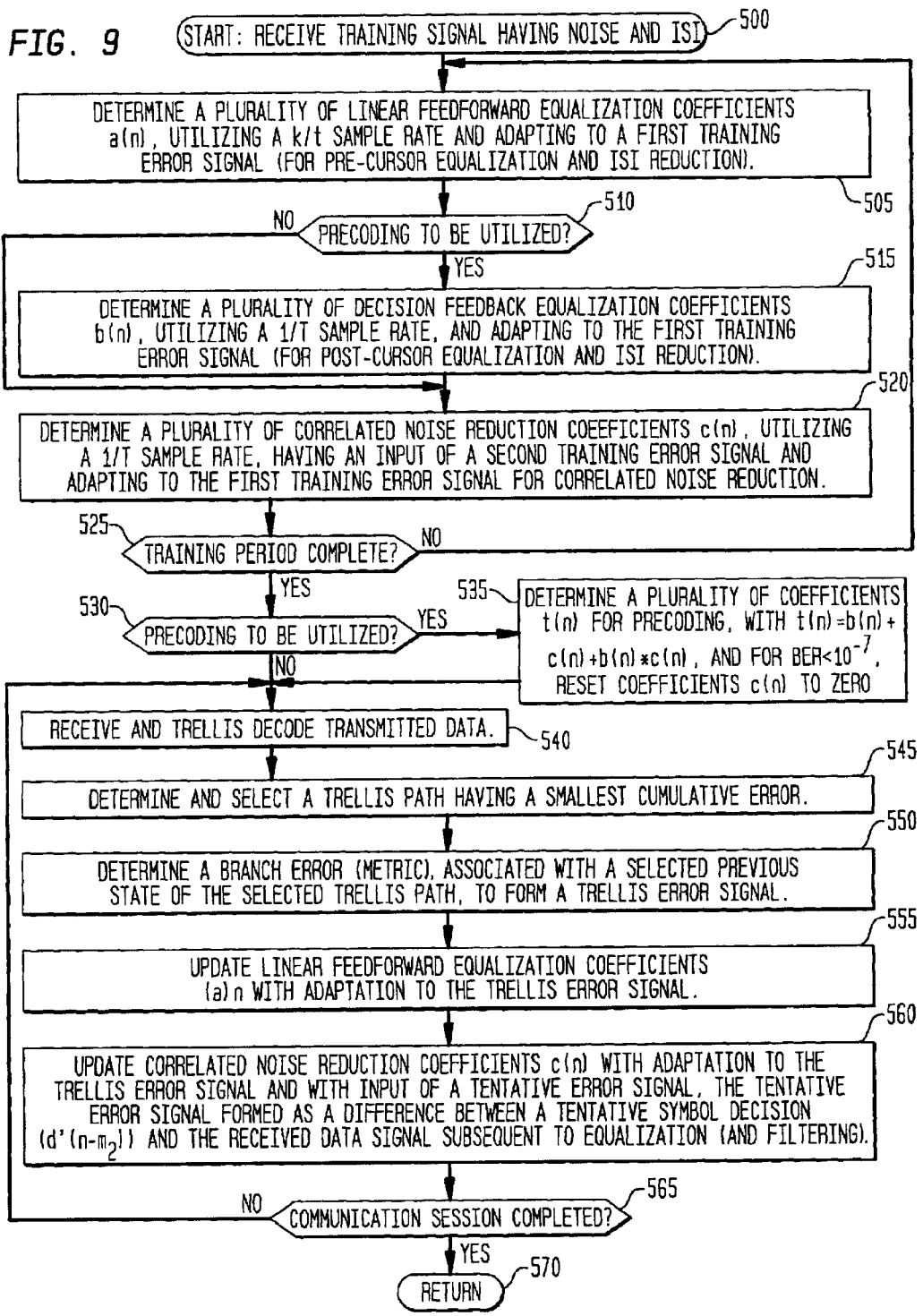
FIG. 9 is a flow diagram illustrating a method embodiment in accordance with the present invention.

FIG. 9 is a flow diagram illustrating a method of correlated noise reduction, during both training and data modes, in accordance with the present invention, and provides a useful summary. The method begins, start step 500, with the reception of a training signal having noise and ISI, with the noise being, for example, additive noise. As indicated above, such noise typically has a significant correlated portion, from sources such as crosstalk and residual echo. In step 505, the method determines a plurality of linear feedforward equalization coefficients a(n), with the received training signal as input, preferably utilizing a k/T sample rate, and adapting to a first training error signal, predominantly for pre-cursor equalization and ISI reduction. As indicated above, in the preferred embodiment, the first training error signal is formed as a difference between a symbol decision and a received signal subsequent to equalization and correlated noise reduction. When precoding is to be utilized, step 510, the method proceeds to step 515 and determines a plurality of decision feedback equalization coefficients b(n), preferably utilizing a 1/T sample rate, the symbol decision as input, and also adapting to the first training error signal, predominantly for post-cursor equalization and ISI reduction. When precoding is not to be utilized in step 510, the method does not implement step 515, proceeding to step 520. In step 520, the method determines a plurality of correlated noise reduction coefficients c(n), preferably utilizing a 1/T sample rate, adapting to a first training error signal, and using a second training error signal as input, with the second training error signal formed by a difference between a symbol decision and a received symbol subsequent to equalization (but prior to any correlated noise reduction), step 520. While a training period is in progress, step 525, the method returns to step 505, for repeated iterations of steps 505, 510, 515 and 520. While for ease of reference in FIG. 9, steps 505, 515 and 520 are illustrated in a sequence, it should be noted that in the preferred embodiment, the adaptation periods for the coefficient determination steps 505, 515 and 520 overlap in time. More specifically, coefficient determination steps 505, 515 and 520 preferably occur concurrently, with continued adaptation of the coefficients a(n), b(n) and c(n) occurring concurrently and, in general, not independently.

When the training period is completed in step 525, and when precoding is to be utilized (step 530), the method determines a plurality of correlated noise reduction and equalization coefficients (Tomlinson coefficients) for transmission-side precoding, as $t(n)=b(n)+c(n)+b(n)*c(n)$, and for bit error rates less than $10^{-7}$, resets the correlated noise reduction coefficients c(n) to zero, step 535. As mentioned above, the determination of Tomlinson coefficients may be performed by either a transmitter or a receiver. Following step 535, or when precoding is not to be utilized (step 530), the method proceeds to step 540, in which data is received from another transmitter and is trellis decoded. The data may or may not be precoded with the correlated noise reduction and equalization coefficients t(n). As the data is being trellis decoded, the method determines and selects a trellis path (or trace) having a smallest or least cumulative error, step 545. Next, the method determines a decision (or branch) error, associated with a selected previous state of the selected trellis path, to form a trellis error signal, step 550. As mentioned above, in the preferred embodiment, an immediately previous state is selected from the trellis path having the least cumulative error (i.e., the previous state at time $t=(n-1)$), and its associated or corresponding decision (or branch) error forms the trellis error signal.

Continuing to refer to FIG. 9, following step 550, the method then updates the linear feedforward equalization coefficients a(n), with adaptation to the trellis error signal, step 555, and updates the correlated noise reduction coefficients, with adaptation to the trellis error signal, and with input of a tentative error signal, step 560. As mentioned above, the tentative error signal is a tentative decision error, formed as a difference between a tentative symbol decision $(d'(n-m_2))$, preferably with $m_2=1$, and the received data signal subsequent to equalization (and filtering, for various embodiments). As a consequence, the linear feedforward equalization coefficients a(n) and the correlated noise reduction coefficients c(n) (or as c'(n) or c"(n)), are allowed to update in response to potentially changing noise conditions. While the communication session is in progress, step 565, the method returns to step 540, to receive and decode trellis encoded data, determine the trellis and tentative error signals, and update the linear feedforward equalization coefficients and correlated noise reduction coefficients. Following completion of the data communication session, step 565, the method may end, return step 570.

Figure 10:
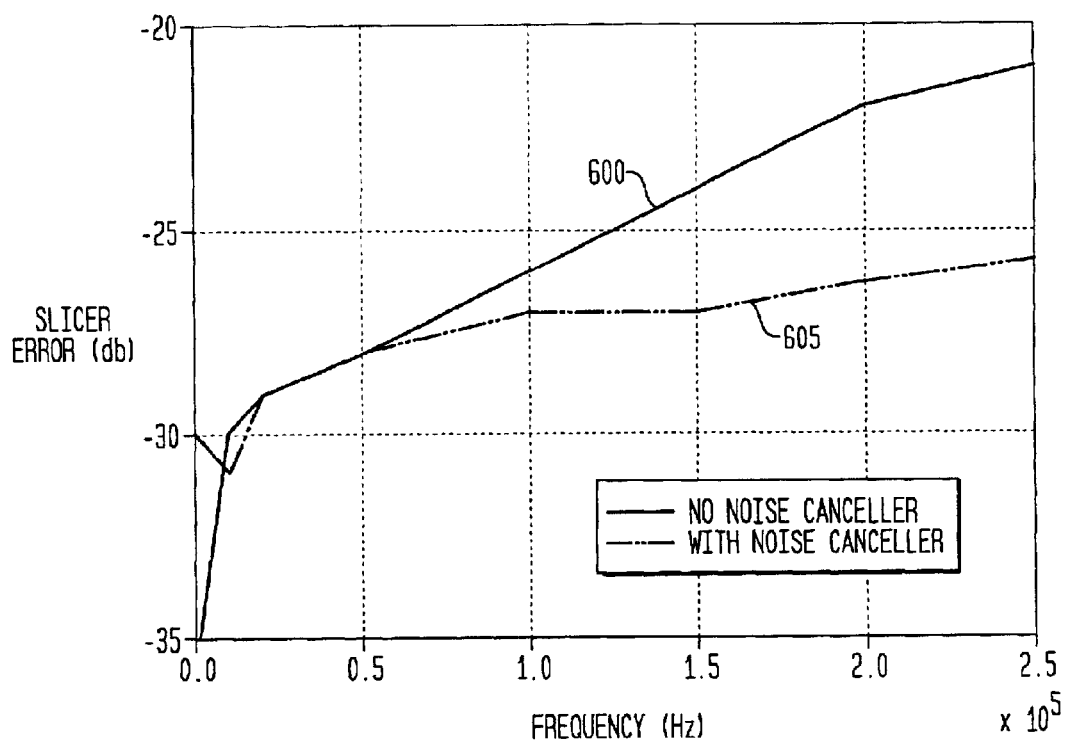
FIG. 10 is an exemplary graph diagram illustrating improved performance and reduced slicer error utilizing the preferred apparatus of the present invention.

FIG. 10 is a graph diagram illustrating, as a simplified example, improved performance and reduced slicer error utilizing the correlated noise reduction apparatus of the present invention, with slicer error (in dB) (on the ordinate axis) graphed as a function of frequency (on the abscissa axis), for a symbol rate of 500,000 symbols per second. Without a correlated noise reduction apparatus of the present invention, correlated crosstalk results in a "non-flat" slicer error power spectral density (PSD), illustrated as line 600 in FIG. 10 (solid line). With the addition of the correlated noise reduction apparatus of the present invention (with the equalization configuration of LEQ 105 and DFB 150, with noise predictor 160, as illustrated in FIG. 4), the slicer error PSD can be "flattened", illustrated as line 605 in FIG. 10 (dotdash line). This "flatter" slicer error PSD lowers the average slicer error power, thereby providing an improved SNR (signal to noise ratio).

Figure 11:
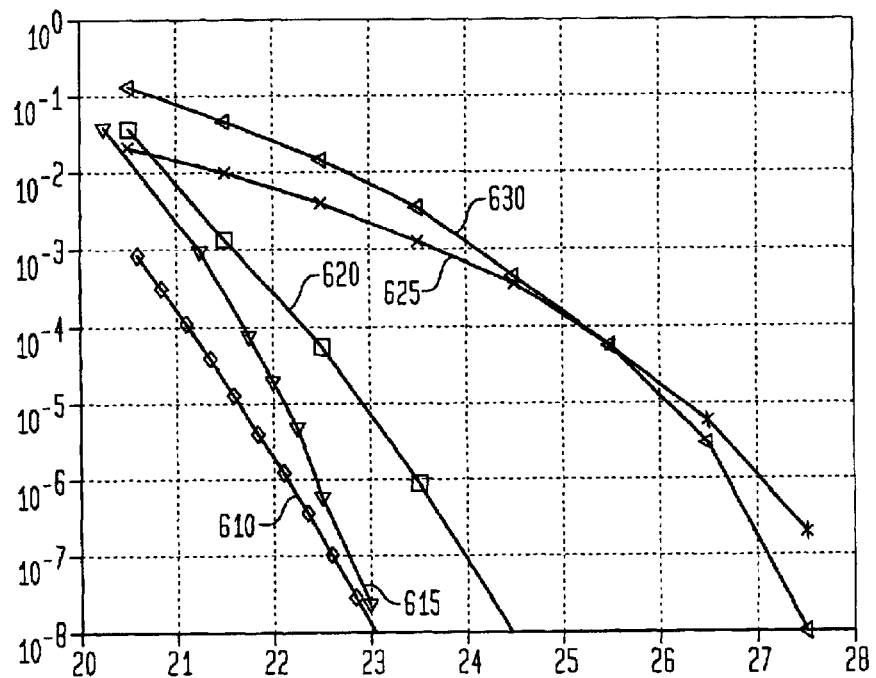
FIG. 11 is an exemplary graph diagram illustrating improved performance and reduced symbol error rate under various conditions utilizing the preferred apparatus of the present invention.

FIG. 11 is an exemplary graph diagram illustrating improved performance and reduced symbol error rate under various conditions utilizing the correlated noise reduction apparatus of the present invention, with symbol error rate (SER) (on the ordinate axis) graphed as a function of slicer SNR (on the abscissa axis). Line 610 illustrates an ideal situation, that of SER v. slicer SNR for 512-state trellis coding with ideal white Gaussian noise. Conversely, at the other extremes, line 630 illustrates SER v. slicer SNR with no trellis coding but having ideal white Gaussian noise, while line 625 illustrates SER v. slicer SNR with 512-state trellis coding using 1-step delayed decision with correlated noise. Illustrating coding gain under conditions of correlated noise, line 620 illustrates SER v. slicer SNR for 512-state trellis coding with correlated noise but without a correlated noise reduction apparatus of the present invention. Lastly, illustrating additional improved performance beyond coding gain, line 615 illustrates SER v. slicer SNR for 512-state trellis coding with correlated noise and with a correlated noise reduction apparatus of the present invention. Apparent from FIG. 11, the coding gain of the 512-state trellis code is only approximately 4 dB when the noise is not white. When the correlated noise reduction apparatus of the present invention is used, however, the coding gain of the 512-state trellis code is improved to nearly 5 dB. As a consequence, the performance margin, as measured at SER=$10^{-7}$, may be improved as much as 1 dB with the correlated noise reduction apparatus of the present invention, in addition to the higher average slicer SNR.

FIG. 12 is an exemplary tabular diagram illustrating improved performance margins under various conditions utilizing the correlated noise reduction apparatus of the present invention. Simulations at Adtran, Inc. were conducted to evaluate the performance improvement by employing a noise predictor of the present invention within an existing HDSL2 system. Correlated crosstalk environments 720 included environment 700 (24 T1 lines plus 24 HDSL2 (C) lines), environment 705 (39 HDSL2 (C) lines), environment 710 (24 ADSL lines plus 24 HDSL(C) lines), and environment 715 (24 T1 lines plus 24 HDSL2 (R) lines). Experimental measurements found that the performance margin improves approximately 1.5 dB (column 735) on average for most of the correlated crosstalk noise environments as specified in the HDSL2 standard.

Numerous advantages of the present invention may be apparent from the discussion above. First, the correlated noise reduction embodiments of the present invention substantially reduce correlated or non-white noise in data reception and transmission, and provide a significant increase in performance of 1–2 dB. The correlated noise reduction apparatus provides a third level of correlated noise reduction, following two levels of equalization, and is readily adaptive, converging quickly to optimal linear filter values without excessive training time. The various correlated noise reduction embodiments of the present invention provide noise whitening within a system utilizing a trellis decoder, and also with transmission-side precoding. In addition to providing precoding coefficients, the preferred correlated noise reduction embodiments of the present invention provide adaptive functionality during data transmission, to adjust to changing noise levels and spectral distributions.

From the foregoing, it will be observed that numerous variations and modifications may be effected without departing from the spirit and scope of the novel concept of the invention. It is to be understood that no limitation with respect to the specific methods and apparatus illustrated herein is intended or should be inferred. It is, of course, intended to cover by the appended claims all such modifications as fall within the scope of the claims.

It is claimed:

1. An apparatus for correlated noise reduction, the apparatus comprising:

a trellis decoder, the trellis decoder operative to provide decoded data and a trellis error signal, the trellis error signal formed as a decision error of a selected previous state of a selected trellis path;

a linear feedforward equalizer, the linear feedforward equalizer having as input a received data signal, the linear feedforward equalizer operatively coupled to the trellis decoder for adaptation to the trellis error signal to modify a first plurality of equalization coefficients a(n); and a noise predictor, the noise predictor operatively coupled to the linear feedforward equalizer to provide an input to the trellis decoder, the noise predictor having as input a tentative error signal, the tentative error signal formed as a difference between a tentative symbol decision by the trellis decoder and a delayed received data signal subsequent to equalization, the noise predictor operatively coupled to the trellis decoder for adaptation to the trellis error signal to modify a plurality of correlated noise reduction coefficients c(n).

2. The apparatus of claim 1, wherein the trellis decoder is further operative to determine a plurality of trellis paths, to determine a cumulative error associated with each trellis path to the plurality of trellis paths, and to select a trellis path, from the plurality of trellis paths, having a smallest cumulative error, to form the selected trellis path.

3. The apparatus of claim 1, wherein the trellis decoder is further operative to select an immediately previous state of the selected trellis path to form the selected previous state.

4. The apparatus of claim 1, wherein the tentative symbol decision and the delayed received data signal subsequent to equalization have one symbol time delay.

5. The apparatus of claim 1, wherein for precoded data, an output of the linear feedforward equalizer is filtered utilizing a transfer function of (1+C(z)), wherein C(z) is a z-transform of the correlated noise reduction coefficients c(n).

6. The apparatus of claim 1, further comprising:

a decision feedback adaptive filter operatively coupled to an output of the linear feedforward equalizer.

7. The apparatus of claim 6, wherein for precoded data:

the trellis decoder further has a symbol decider operative during a training mode to provide a symbol decision and a first training error signal, the first training error signal formed as a difference between the symbol decision and a received training signal subsequent to equalization and correlated noise reduction;

the linear feedforward equalizer further has as input the received training signal during the training mode, the linear feedforward equalizer operatively coupled to the trellis decoder for adaptation to the first training error signal during training mode to provide the first plurality of coefficient a(n) for equalization;

the decision feedback adaptive filter is further operatively coupled to the symbol decider for input of the symbol decision, for adaptation to the first training error signal and to provide a second plurality of equalization coefficients b(n); and the noise predictor, further having an output operatively coupled to a combined output of the linear feedforward equalizer and the decision feedback adaptive filter to provide an input to the symbol decider, the noise predictor having as input a second training error signal, the second training error signal error signal formed as a difference between the symbol decision and the received training signal subsequent to equalization, and the noise predictor operatively coupled to the symbol decider for adaptation to the first training error signal to provide the plurality of correlated noise reduction coefficients c(n).

8. The apparatus of claim 7, further comprising:
a processor operatively coupled to the decision feedback adaptive filter and to the noise predictor, wherein the processor, when operative, is configured to determine a plurality of precoding coefficients t(n) as equal to a sum of the second plurality of equalization coefficients b(n) plus the plurality of correlated noise reduction coefficients c(n) plus the result of a convolution of the second plurality of equalization coefficients b(n) with the plurality of correlated noise reduction coefficients c(n)(t(n)=b(n)+c(n)+b(n)*c(n)); and
wherein the processor is further configured to transfer the plurality of precoding coefficients t(n) to a transmitter for precoding of data for transmission.

9. The apparatus of claim 7, further comprising:
a first transmitter configured to transfer the plurality of equalization coefficients b(n) and the plurality of correlated noise reduction coefficients c(n) to a second transmitter for precoding using a plurality of precoding coefficients t(n) determined by the second transmitter as equal to a sum of the second plurality of equalization coefficients b(n) plus the plurality of correlated noise reduction coefficients c(n) plus the result of a convolution of the second plurality of equalization coefficients b(n) with the plurality of correlated noise reduction coefficients c(n)(t(n)=b(n)+c(n)+b(n)*c(n)).

10. The apparatus of claim 1, wherein for non-precoded data:
the trellis decoder further has a symbol decider operative during a training mode to provide a symbol decision and a first training error signal, the first training error signal formed as a difference between the symbol decision and a received training signal subsequent to equalization and correlated noise reduction;
the linear feedforward equalizer further has as input the received training signal during the training mode, the linear feedforward equalizer operatively coupled to the trellis decoder for adaptation to the first training error signal during training mode to provide the first plurality of coefficients a(n) for equalization; and
the noise predictor further has as input a second training error signal, the second training error signal formed as a difference between the symbol decision and the received training signal subsequent to equalization, and the noise predictor operatively coupled to the symbol decider for adaptation to the first training error signal to provide the plurality of correlated noise reduction coefficients c(n).

11. The apparatus of claim 1, wherein the noise predictor is embodied as a linear adaptive filter operative with at least mean square algorithm.

12. An apparatus for correlated noise reduction, the apparatus having a training mode and having a data mode, the apparatus operative during training mode to receive a training signal from a transmitter and operative during data mode to receive a data signal from the transmitter, the apparatus comprising:
a trellis decoder, the trellis decoder having a symbol decider operative during the training mode to provide a symbol decision and a first training error signal, the first training error signal formed as a difference between the symbol decision and a received training signal subsequent to equalization and correlated noise reduction, the trellis decoder operative during the data mode to provide decoded data and a trellis error signal, the trellis error signal formed as a decision error of a selected previous state of a selected trellis path;
a linear feedforward equalizer, the linear feedforward equalizer having as input the received training signal during the training mode and a received data signal during data mode, the linear feedforward equalizer operatively coupled to the trellis decoder for adaptation to the first training error signal during training mode to provide a first plurality of coefficients a(n) for equalization and for adaptation to the trellis error signal during data mode to modify the first plurality of coefficients a(n) for adaptive equalization;
a training mode adaptive distortion and correlated noise canceller operative during training mode, an output of the training mode adaptive distortion and correlated noise canceller operatively coupled to an output of the linear feedforward equalizer to provide an input to the symbol decider of the trellis decoder, the training mode adaptive distortion and correlated noise canceller having as input a second training error signal, the second training error signal formed as a difference between the symbol decision and the received training signal subsequent to equalization, the training mode adaptive distortion and correlated noise canceller operatively coupled to the trellis decoder for adaptation to the first training error signal to provide a second plurality of coefficients b(n) for equalization and a third plurality of coefficients c(n) for correlated noise reduction; and
a data mode adaptive correlated noise canceller operative during data mode, an output of the data mode adaptive correlated noise canceller operatively coupled to a filter output of the linear feedforward equalizer to provide an input to the trellis decoder, the data mode adaptive correlated noise canceller having as input a tentative error signal, the tentative error signal formed as a difference between a tentative symbol decision and a delayed received data signal subsequent to equalization, the data mode adaptive correlated noise canceller operatively coupled to the trellis decoder for adaptation to the trellis error signal during data mode to modify the third plurality of coefficients c(n) for adaptive correlated noise reduction.

13. The apparatus of claim 12, wherein the trellis decoder is further operative during data mode to determine a plurality of trellis paths, to determine a cumulative error associated with each trellis path of the plurality of trellis paths, and to select a trellis path, from the plurality of trellis paths, having a smallest cumulative error, to form the selected trellis path.

14. The apparatus of claim 12, wherein the trellis decoder is further operative to select an immediately previous state of the selected trellis path to form the selected previous state.

15. The apparatus of claim 12, wherein the data mode adaptive correlated noise canceller is further operative, when data has been precoded, to reset the third plurality of coefficients c(n) to zero subsequent to training mode and prior to data mode.

16. The apparatus of claim 12, wherein the tentative symbol decision and the delayed received data signal subsequent to equalization have one symbol time delay.

17. The apparatus of claim 12, further comprising:
a processor coupled to the training mode adaptive distortion and correlated noise canceller, wherein the processor, when operative, is configured to determine a fourth plurality of coefficients t(n) as equal to a sum of the second plurality of coefficients b(n) plus the third plurality of coefficients c(n) plus the result of a convolution of the second plurality of coefficients b(n) with the third plurality of coefficients c(n)(t(n)=b(n)+c(n)+b(n)*c(n)), and wherein the processor is further configured to transfer the fourth plurality of coefficients t(n) to the transmitter for precoding of data for transmission.

18. The apparatus of claim 12, wherein the training mode adaptive distortion and correlated noise canceller is further configured to transfer the second plurality of coefficients b(n) and the third plurality of coefficients c(n) to the transmitter for precoding using a fourth plurality of coefficients t(n), the fourth plurality of coefficients t(n) determined by the transmitter as equal to a sum of the second plurality of coefficients b(n) plus the third plurality of coefficients b(n) with the third plurality of coefficients c(n)(t(n)+b(n)+c(n)+b(n)*c(n)).

19. The apparatus of claim 12, wherein the filtered output of the linear feedforward equalizer is generated by a filter having a transfer function of (1+C(z)), wherein C(z) is a z-transform of the third plurality of coefficients c(n).

20. The apparatus of claim 12, wherein the training mode adaptive distortion and correlated noise canceller further comprises:
a decision feedback adaptive filter operatively coupled to an output of the linear feedforward equalizer, the decision feedback adaptive filter operatively coupled the symbol decider for input of the symbol decision, for adaptation to the first training error signal and to provide the second plurality of coefficients b(n) for equalization; and
a noise predictor, the noise predictor having an output operatively coupled to a combined output of the linear feedforward equalizer and the decision feedback adaptive filter to provide an input to the symbol decider, the noise predictor having as input the second training error signal, and the noise predictor operatively coupled to the symbol decider for adaptation to the first training error signal to provide the third plurality of coefficients c(n) for correlated noise reduction.

21. A method of correlated noise reduction, the method comprising:
(a) receiving a data signal to form a received data signal;
(b) determining a trellis error signal as a decision error of a selected previous state of a selected trellis path;
(c) equalizing a received data signal utilizing a first plurality of equalization coefficients a(n) to form an equalized data signal and modifying the first plurality of equalization coefficients a(n) in response to the trellis error signal;
(d) determining a tentative error signal as a difference between a tentative symbol decision and a delayed equalized data signal;
(e) reducing correlated noise in the equalized data signal utilizing a plurality of correlated noise reduction coefficients c(n) and modifying the plurality of correlated noise reduction coefficients c(n) in response to the trellis error signal and with input of the tentative error signal.

22. The method of claim 21, wherein step (b) further comprises:
determining a plurality of trellis paths;
determining a cumulative error associated with each trellis path of the plurality of trellis paths; and
selecting a trellis path, from the plurality of trellis paths, having a smallest cumulative error, to form the selected trellis path.

23. The method of claim 21, wherein step (b) further comprises:
selecting an immediately previous state of the selected trellis path to form the selected previous state.

24. The method of claim 21, wherein step (d) further comprises:
selecting the tentative symbol decision and the delayed equalized data signal having one symbol time delay.

25. The method of claim 21, wherein step (c) further comprises:
filtering the equalized data signal utilizing a transfer function of (1+C(z)), wherein C(z) is a z-transform of the correlated noise reduction coefficients c(n).

26. The method of claim 21, further comprising:
trellis decoding the received data signal subsequent to equalization and correlated noise reduction.

27. The method of claim 21, further comprising, prior to step (a):
receiving a training signal to form a received training signal;
determining a first training error signal as a difference between a symbol decision and the received training signal subsequent to equalization and correlated noise reduction;
determining the first plurality of equalization coefficients a(n) using the received training signal and with adaptation to the first training error signal;
determining a second plurality of equalization coefficients b(n) using the symbol decision and with adaptation to the first training error signal;
determining a second training error signal as a difference between the symbol decision and the received training signal subsequent to equalization; and
determining the plurality of correlated noise reduction coefficients c(n) for correlated noise reduction using the second training error signal and with adaptation to the first training error signal.

28. The method of claim 27, further comprising:
determining a plurality of precoding coefficients t(n) as equal to a sum of the second plurality of equalization coefficients b(n) plus the plurality of correlated noise reduction coefficients c(n) plus the result of a convolution of the second plurality of equalization coefficients b(n) with the plurality of correlated noise reduction coefficients c(n)(t(n)=B(n)+c(n)+b(n)*c(n)).

29. The method of claim 21, further comprising, prior to step (a):
receiving a training signal to form a received training signal;
determining a first training error signal as a difference between a symbol decision and the received training signal subsequent to equalization and correlated noise reduction;
determining a second training error signal as a difference between the symbol decision and the received training signal subsequent to equalization; and
determining the plurality of correlated noise reduction coefficients c(n) for correlated noise reduction using the second training error signal and with adaptation to the first training error signal.

30. An apparatus for correlated noise reduction, the apparatus comprising:

means for receiving a data signal to form a received data signal;

means for determining a trellis error signal as a decision error of a selected previous state of a selected trellis path;

means for equalizing a received data signal utilizing a first plurality of equalization coefficients $a(n)$ to form an equalized data signal and modifying the first plurality of equalization coefficients $a(n)$ in response to the trellis error signal;

means for determining a tentative error signal as a difference between a tentative symbol decision and a delayed equalized data signal;

means for reducing correlated noise in the equalized data signal utilizing a plurality of correlated noise reduction coefficients $c(n)$ and modifying the plurality of correlated noise reduction coefficients $c(n)$ in response to the trellis error signal and with input of the tentative error signal.

31. The apparatus of claim 30, further comprising:
means for determining a plurality of trellis paths;
means for determining a cumulative error associated with each trellis path of the plurality of trellis paths; and
means for selecting a trellis path, from the plurality of trellis paths, having a smallest cumulative error, to form the selected trellis path.

32. The apparatus of claim 30, further comprising:
means for selecting an immediately previous state of the selected trellis path to from the selected previous state.

33. The apparatus of claim 30, further comprising:
means for selecting the tentative symbol decision and the delayed equalized data signal having one symbol time delay.

34. The apparatus of claim 30, further comprising:
means for filtering the equalized data signal utilizing a transfer function of $(1+C(z))$, wherein $C(z)$ is a z-transform of the correlated noise reduction coefficients $c(n)$.

35. The apparatus of claim 30, further comprising:
means for trellis decoding the received data signal subsequent to equalization and correlated noise reduction.

36. The apparatus of claim 30, further comprising:
means for receiving a training signal to form a received training signal;
means for determining a first training error signal as a difference between a symbol decision and the received training signal subsequent to equalization and correlated noise reduction;
means for determining the first plurality of equalization coefficients $a(n)$ using the received training signal and with adaptation to the first training error signal;
means for determining a second plurality of equalization coefficients $b(n)$ using the symbol decision and with adaptation to the first training error signal;
means for determining a second training error signal as a difference between the symbol decision and the received training signal subsequent equalization; and
means for determining the plurality of correlated noise reduction coefficients $c(n)$ for correlated noise reduction using the second training error signal and with adaptation to the first training error signal.

37. The apparatus of claim 36, further comprising:
means for determining a plurality of precoding coefficients $t(n)$ as equal to a sum of the second plurality of equalization coefficients $b(n)$ plus the plurality of correlated noise reduction coefficients $c(n)$ plus the result of a convolution of the second plurality of equalization coefficients $b(n)$ with the plurality of correlated noise reduction coefficients $c(n)(t(n)=+c(n)+b(n)*c(n))$.

38. The apparatus of claim 30, further comprising:
means for receiving a training signal to form a received training signal;
means for determining a first training error signal as a difference between a symbol decision and the received training signal subsequent to equalization and correlated noise reduction;
means for determining the first plurality of equalization coefficients $a(n)$ using the received training signal and with adaptation to the first training error signal;
means for determining a second training error signal as a difference between the symbol decision and the received training signal subsequent to equalization; and
means for determining the plurality of correlated noise reduction coefficients $c(n)$ for correlated noise reduction using the second training error signal and with adaptation to the first training error signal.

39. A system for reduction of correlated noise during data transmission, the system comprising:

a transmitter, the transmitter operative to transmit a training signal and to transmit a data signal; and a receiver couplable to the transmitter via a communication channel, the receiver further comprising:

a trellis decoder, the trellis decoder operative to provide decoded data and a trellis error signal, the trellis error signal formed as a decision error of a selected previous state of a selected trellis path;

a linear feedforward equalizer, the linear feedforward equalizer having as input a received data signal, the linear feedforward equalizer operatively coupled to the trellis decoder for adaptation to the trellis error signal to modify a first plurality of equalization coefficients $a(n)$; and a noise predictor, the noise predictor operatively coupled to the linear feedforward equalizer to provide an input to the trellis decoder, the noise predictor having as input a tentative error signal, the tentative error signal formed as a difference between a tentative symbol decision by the trellis decoder and a delayed received data signal subsequent to equalization, the noise predictor operatively coupled to the trellis decoder for adaptation to the trellis error signal to modify a plurality of correlated noise reduction coefficients $c(n)$.

40. The system of claim 39, wherein the trellis decoder is further operative to determine a plurality of trellis paths, to determine a cumulative error associated with each trellis path of the plurality of trellis paths, and to select a trellis path, from the plurality of trellis paths, having a smallest cumulative error, to form the selected trellis path.

41. The system of claim 39, wherein the trellis decoder is further operative to select an immediately previous state of the selected trellis path to form the selected previous state.

42. The system of claim 39, wherein the tentative symbol decision and the delayed received data signal subsequent to equalization are selected at a time of one symbol time delay.

43. The system of claim 39, wherein for precoded data, an output of the linear feedforward equalizer is filtered utilizing a transfer function of (1+C(z)), wherein C(z) is a z-transform of the correlated noise reduction coefficients c(n).

44. The system of claim 39, wherein the receiver further comprises:
a decision feedback adaptive filter operatively coupled to an output of the linear feedforward equalizer.

45. The system of claim 39, wherein for precoded data:
the trellis decoder further has a symbol decider operative during a training mode to provide a symbol decision and a first training error signal, the first training error signal formed as a difference between the symbol decision and a received training signal subsequent to equalization and correlated noise reduction;
the linear feedforward equalizer further has as input the received training signal during the training mode, the linear feedforward equalizer operatively coupled to the trellis decoder for adaptation to the first training error signal during training mode to provide the first plurality of coefficients a(n) for equalization;
the decision feedback adaptive filter is further operatively coupled to the symbol decider for input of the symbol decision, for adaptation to the first training error signal and to provide a second plurality of equalization coefficients b(n); and
the noise predictor, further having an output operatively coupled to a combined output of the linear feedforward equalizer and the decision feedback adaptive filter to provide an input to the symbol decider, the noise predictor having as input a second training error signal, the second training error signal formed as a difference between the symbol decision and the received training signal subsequent to equalization, and the noise predictor operatively coupled to the symbol decider for adaptation to the first training error signal to provide the plurality of correlated noise reduction coefficients c(n).

46. The system of claim 45, further comprising:
a processor operatively coupled to the decision feedback adaptive filter and to the noise predictor, wherein the processor, when operative, is configured to determine a plurality of precoding coefficients t(n) as equal to a sum of the second plurality of equalization coefficients b(n) plus the plurality of correlated noise reduction coefficients c(n) plus the result of a convolution of the second plurality of equalization coefficients b(n) with the plurality of correlated noise reduction coefficients c(n)(t(n)=b(n)+c(n)+b(n)*c(n)); and
wherein the processor is further configured to transfer the plurality of precoding coefficients t(n) to the transmitter for precoding of data for transmission to form the data signal.

47. The system of claim 45, wherein the transmitter is further configured for precoding of data for transmission to form the data signal using a plurality of precoding coefficients t(n) determined by the transmitter as equal to a sum of the second plurality of equalization coefficients b(n) plus the plurality of correlated noise reduction coefficients c(n) plus the result of a convolution of the second plurality of equalization coefficients b(n) with the plurality of correlated noise reduction coefficients c(n)(t(n)=b(n)+c(n)+b(n)*c(n)).

48. The system of claim 39, wherein for non-precoded data:
the trellis decoder further has a symbol decider operative during a training mode to provide a symbol decision and first training error signal, the first training error signal formed as a difference between the symbol decision and a received training signal subsequent to equalization and correlated noise reduction;
the linear feedforward equalizer further has as input the received training signal during the training mode, the linear feedforward equalizer operatively coupled to the trellis decoder for adaptation to the first training error signal during training mode to provide the first plurality of coefficients a(n) for equalization; and
the noise predictor further has as input a second training error signal, the second training error signal formed as a difference between the symbol decision and the received training signal subsequent to equalization, and the noise predictor operatively coupled to the symbol decider for adaptation to the first training error signal to provide the plurality of correlated noise reduction coefficients c(n).

49. An apparatus for correlated noise reduction, the apparatus having a training mode and having a data mode, the apparatus operative during training mode to receive a training signal from a transmitter and operative during data mode to receive a data signal from the transmitter, the apparatus comprising:
a trellis decoder, the trellis decoder having a symbol decider operative during the training mode to provide a symbol decision and a first training error signal, the first training error signal formed as a difference between the symbol decision and a received training signal subsequent to equalization and correlated noise reduction, the trellis decoder operative during the data mode to provide decoded data and a trellis error signal, the trellis error signal being a decision error of an immediately previous state of a selected trellis path of a plurality of trellis paths, the selected trellis path having a smallest cumulative error of the plurality of trellis paths;
a linear feedforward equalizer, the linear feedforward equalizer having as input the received training signal during the training mode and a received data signal during data mode, the linear feedforward equalizer operatively coupled to the trellis decoder for adaptation to the first training error signal during training mode to provide a first plurality of equalization coefficients a(n) and for adaptation to the trellis error signal during data mode to modify the first plurality of equalization coefficients a(n) for adaptive equalization,
a decision feedback adaptive filter operatively coupled to an output of the linear feedforward equalizer and operatively coupled to the symbol decider for input of the symbol decision, for adaptation to the first training error signal and to provide a second plurality of equalization coefficients b(n) for data transmission precoding;
a noise predictor, the noise predictor operatively coupled to combined output of the linear feedforward equalizer and the decision feedback adaptive filter to provide an input to the trellis decoder, the noise predictor, having as input a second training error signal during training mode, the second training error signal formed as a difference between the symbol decision and the received training signal subsequent to equalization, the noise predictor operatively coupled to the trellis decoder for adaptation to the first training error signal during training mode to provide a plurality of correlated noise reduction coefficients c(n) for data transmission precoding, the noise predictor further having as input a tentative error signal during data mode, the tentative error signal formed as a difference between a tentative symbol decision and a delayed received data signal subsequent to equalization, the tentative symbol decision and the delayed received data signal subsequent to equalization having one symbol time delay, the noise predictor further operatively coupled to the trellis decoder for adaptation to the trellis error signal during data mode to initially reset the plurality of correlated noise reduction coefficients c(n) to zero and to subsequently modify the plurality of correlated noise reduction coefficients c(n) for adaptive correlated noise reduction; and a processor operatively coupled to the decision feedback adaptive filter and to the noise predictor, wherein the processor, when operative, is configured to determine a plurality of precoding coefficients t(n) as equal to a sum of the second plurality of equalization coefficients b(n) plus the plurality of correlated noise reduction coefficients c(n) plus the result of a convolution of the second plurality of equalization coefficients b(n) with the plurality of correlated noise reduction coefficients c(n)(t(n)=b(n)+c(n)+B(n)*c(n)), and wherein the processor is further configured to transfer the plurality of precoding coefficients t(n) to the transmitter for precoding of data for transmission.

* * * * *